US012776177B1

(12) United States Patent
Xiong et al.

(10) Patent No.: US 12,776,177 B1
(45) Date of Patent: Oct. 27, 2026

(54) JUST-IN-TIME IDENTITY VERIFICATION DATA CACHING

(71) Applicant: Amazon Technologies, Inc., Seattle, WA (US)

(72) Inventors: Fei Xiong, Vienna, VA (US); Jeong-O Jeong, Lantana, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/758,964

(22) Filed: Jun. 28, 2024

(51) Int. Cl.
*G07C 9/25* (2020.01)

(52) U.S. Cl.
CPC .......... *G07C 9/25* (2020.01); *G07C 2209/08* (2013.01)

(58) Field of Classification Search
CPC ... G07C 9/20; G07C 9/22; G07C 9/25; G07C 9/253; G07C 9/257; G07C 9/26; G07C 9/27; G07C 2209/08
See application file for complete search history.

(56) References Cited

U.S. PATENT DOCUMENTS 7,239,723 B1 * 7/2007 Al-Sheikh ........... B42D 25/309 382/118
9,516,460 B2 12/2016 Ambrefe, Jr.
10,109,166 B1 10/2018 Selinger et al.
10,366,293 B1 7/2019 Faviero et al.
2005/0110610 A1 * 5/2005 Bazakos ............... G08G 1/207 340/5.82
2014/0298398 A1 * 10/2014 Neely ..................... H04L 63/20 726/4
2016/0343187 A1 * 11/2016 Trani .................... H04W 4/021
2018/0300557 A1 10/2018 Rodenas et al.
2018/0341393 A1 * 11/2018 Frenette ................ H04W 48/20
2020/0211312 A1 * 7/2020 Wisniewski ........... G06Q 20/10
2022/0094550 A1 3/2022 Keith, Jr.
2023/0344705 A1 10/2023 Amini et al.

FOREIGN PATENT DOCUMENTS

EP 3828793 A1 6/2021

* cited by examiner

*Primary Examiner* — Laura A Gudorf
(74) *Attorney, Agent, or Firm* — BakerHostetler

(57) ABSTRACT

Security checkpoint access history data and video may be analyzed to determine physical relationships between checkpoints, such as distances and access dependencies between checkpoints. The physical relationships may be used to determine remaining defense ratings for checkpoints relative to a protected asset. The remaining defense ratings may be used to prioritize security incidents and provide corresponding security alerts. The physical relationships may also be used to issue instructions for caching identity verification data in a local checkpoint data store. The checkpoint access history data may also be used to generate an access model for one or more identities and to detect an inconsistent access behavior that is inconsistent with the access model, thereby indicating a security incident may have occurred.

20 Claims, 11 Drawing Sheets

JUST-IN-TIME IDENTITY VERIFICATION DATA CACHING

CROSS-REFERENCE TO RELATED APPLICATIONS

This application is related to the following application, which is hereby incorporated by reference in its entirety: U.S. patent application Ser. No. 18/758,763 filed Jun. 28, 2024, entitled "ALERT PRIORITIZATION BASED ON SECURITY CHECKPOINT RELATIONSHIPS". This application is also related to the following application, which is also hereby incorporated by reference in its entirety: U.S. patent application Ser. No. 18/759,081 filed Jun. 28, 2024, entitled "HISTORY-BASED SECURITY CHECKPOINT ACCESS MODELING".

BACKGROUND

People and organizations may employ a variety of devices and techniques to control access to various physical locations and physical assets. In one specific example, employees of an organization may be assigned identity badges that may be used as representations of their respective identities. The organization may also install a number of badge readers at various physical locations, such as in the main lobby of a building and at entrances to various floors and/or rooms within the building. To gain access to an area secured by a badge reader, an employee may present his or her badge to the badge reader, which may then electronically read the badge. In some examples, if an employee is authorized to access the area secured by the badge reader, then a signal may be generated to open or unlock a corresponding door, gate, etc. Logs may be generated to provide a historical record of individuals that enter and/or exit through various security checkpoints. Additionally, the security checkpoints may also have associated cameras, for example that record video of individuals as they enter and/or exit through respective security checkpoints.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
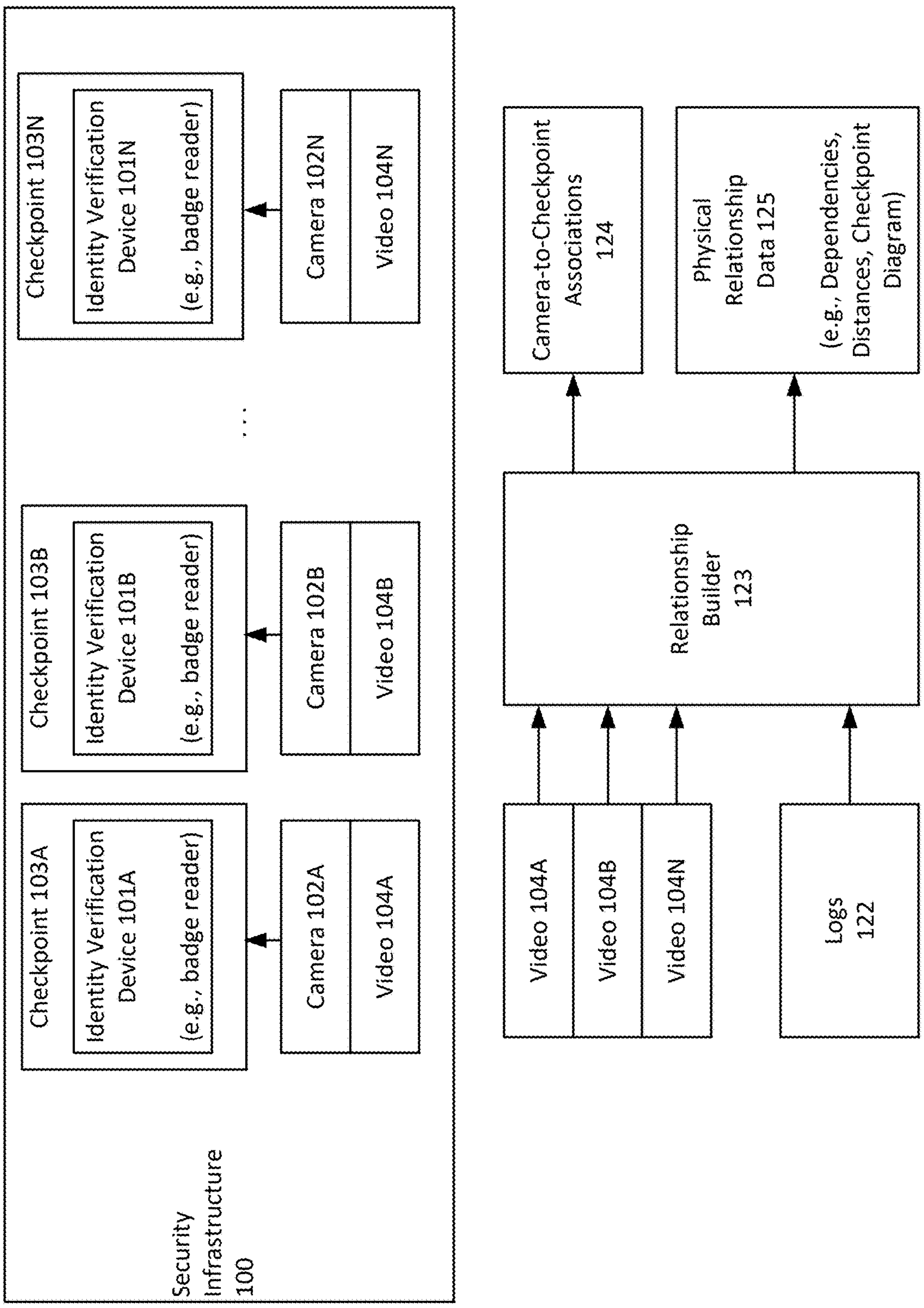
FIG. 1 is a diagram illustrating an example security checkpoint relationship building system that may be used in accordance with the present description.

Techniques for access history-based security checkpoint control, notification and management are described herein. The techniques described herein relate to environments in which access to one or more physical locations and/or physical assets is controlled, such as via one or more security checkpoints. In one specific example, a security checkpoint may include a badge reader that is configured to read badges representative of people's identities, for example employees of a business or other organization. It is noted however, that the techniques described herein are not limited to any particular type of identity verification device. It is also noted that the techniques described herein may be employed in a variety of contexts, for example including home security, public or private building (e.g., office) security, multi-building and/or multi-campus security for large organizations, and others. Identity verification devices may be installed at various security checkpoints, such as at front doors, building lobbies, entrances to building floors, entrances to rooms and/or assets within a room, and at other locations. Logs may be generated to provide a historical record of individuals that enter and/or exit through various security checkpoints. In some examples, each log entry may include information such as an identity (e.g., name) of a person entering and/or exiting a respective checkpoint, a time of the entrance or exit, an indication of the respective checkpoint location (e.g., building name, floor number, room number, etc.) and/or other related information.

In some examples, security checkpoints may have associated cameras, for example that record video of individuals as they enter and/or exit through respective security checkpoints. It is desirable for users to know which cameras capture video of which checkpoints. This knowledge may allow users to easily find and view video footage to investigate security events. In some cases, administrators of a system may manually identify associations between a security checkpoint and a corresponding camera. For example, a system administrator may specify that camera X captures video of checkpoint Y. This may be helpful, particularly for scenarios in which a given organization has a large quantity of security checkpoints with corresponding identity verification devices and cameras. In some cases, however, such as when system administrators do not take the time to manually identify associations between checkpoints and cameras, it may be unclear which camera is capturing video from which checkpoint.

According to the techniques described herein, associations between cameras and checkpoints may be generated automatically based on a computer-executed analysis of identity verification device logs and camera video. For example, in some cases, camera video may be analyzed via computer-based image processing techniques to determine times at which people enter and/or exit through a security checkpoint. In some examples, the video may be analyzed using computer-based object recognition techniques, such as to detect human faces and/or other body parts within in the video, thereby indicating that a person is entering or exiting through a security checkpoint that is within the field of view of the camera. In some cases, frames within the video may be timestamped, such as to allow a correlation between a given frame and the time it was captured by the camera. Additionally, the identity verification device logs may also be analyzed to identify times at which people entered and/or exited the security checkpoint. Amounts of correlation may then be determined between the enter and/or exit times in the video relative to the enter and/or exit times in identity verification device logs. In some examples, a given camera may be matched to a given checkpoint with which the given camera shares the highest amount of correlation between enter and/or exit times in camera video and checkpoint logs. In some examples, a correlation of times in the camera video and checkpoint logs may be required to exceed a threshold amount (e.g., percentage and/or quantity of correlated times, etc.) in order for a camera to be associated with a checkpoint.

According to another aspect of the techniques described herein, camera video and/or checkpoint log data may also be used to determine physical relationships between different security checkpoints. In some examples, the determined physical relationships may include a distance between two checkpoints and/or an access dependency between two checkpoints. An access dependency, as that term is used herein, refers to a physical relationship in which a person must enter through a first checkpoint prior to entering a second checkpoint. Access to a second checkpoint is dependent on entering a first checkpoint when a person must enter through the first checkpoint prior to entering the second checkpoint. As described herein, in order to enter through the first checkpoint, the person may be required to present, at the first checkpoint, identity verification data that matches stored reference identity verification data. One common example of this is in the context of a building that has a first checkpoint in the building lobby and a second checkpoint at the entrance to an interior room (e.g., a conference room) within the building. In this example, in order for a person to access the interior room, the person's identity must be validated by the second security checkpoint. However, prior to arriving at the second security checkpoint, the person must first enter through the building lobby and successfully pass through the first security checkpoint, such as by presenting identity verification data that matches stored reference identity verification data. In this example, access to the second checkpoint is dependent on entering the first checkpoint.

To determine physical relationships between different security checkpoints, checkpoint history data (e.g., checkpoint video and/or identity verification device logs) may be analyzed to identify times at which people entered and/or exited through each security checkpoint. These entrance and/or exit times may then be used to determine common checkpoint access sequences. For example, in some cases, if the checkpoint history data indicates that each person that has entered Checkpoint B has also previously entered Checkpoint A, then it may be determined that access to Checkpoint B is dependent on entering Checkpoint A. Additionally, the checkpoint history data may be analyzed to determine an average time difference between the times at which Checkpoints A and B were accessed. In one specific example, it may be determined that, on average, that Checkpoint A was accessed thirty seconds before Checkpoint B. In some examples, the average access time difference may be divided by an estimated human walking speed to in order to determine an estimated distance between checkpoints. For example, in some cases, it may be assumed that the average human walks at a speed of 1.5 meters per second. Accordingly, in this example, the estimated distance between Checkpoints A and B may be determined to be twenty meters (thirty seconds divided by 1.5 meters per second). In some examples, a checkpoint diagram may be generated that represents the determined physical relationships (e.g., distances and/or access dependencies) between security checkpoints.

In some examples, the determined physical relationships between security checkpoints may be used to prioritize notifications of security incidents (e.g., a security breaches) occurring at different security checkpoints. For example, consider the scenario in which a protected asset is directly protected by a corresponding security checkpoint, referred to as an asset security checkpoint. The term directly protected, as used herein, means that there are no intervening security checkpoints between the asset security checkpoint and the protected asset. For example, in some cases, the asset security checkpoint may be located at the entrance to a room that contains the protected asset. The physical relationships between security checkpoints may be used to determine a remaining defense rating for each security checkpoint relative to the protected asset. The term remaining defense rating refers to a rating that indicates an amount of defensive security for a respective checkpoint relative to a protected asset.

In some examples, the remaining defense rating may be calculated based on a weighted hierarchy of physical relationships. In one specific example, a number of intervening security checkpoints relative to the protected asset may be a first-highest weighted physical relationship in the weighted hierarchy of physical relationships. The number of intervening security checkpoints relative to the protected asset may be the number of intervening security checkpoints between a given security checkpoint and the asset security checkpoint. Additionally, a distance between security checkpoints may be a second-highest weighted physical relationship in the weighted hierarchy of physical relationships. For example, the distance between security checkpoints may be used as a tiebreaker when two checkpoints have the same number of intervening security checkpoints relative to the protected asset. To illustrate this concept, consider a scenario in which there is a first security checkpoint, a second security checkpoint, and a third security checkpoint. Now suppose that there is one intervening security checkpoint between the first security checkpoint and the asset security checkpoint. Additionally, suppose that there are zero security checkpoints between the second security checkpoint and the asset security checkpoint. Furthermore, suppose that there are also zero security checkpoints between the second security checkpoint and the asset security checkpoint. In this scenario, the first checkpoint may have a higher remaining defense rating than both the second and third checkpoints because the first checkpoint has more intervening security checkpoints (one) than the second and third security checkpoints have (zero) relative to the protected asset. Moreover, suppose that the second checkpoint is twenty meters from the asset checkpoint. Additionally, suppose that the third checkpoint is ten meters from the asset checkpoint. In this example, the distance may be used as a tiebreaker between the second and third security checkpoints, and the second security checkpoint may have a higher remaining defense rating than the third checkpoints because the second checkpoint is further away from the asset checkpoint (twenty meters) than the third checkpoint (ten meters).

When security incidents (e.g., a security breaches) occur at one or more security checkpoints, the remaining defense ratings may be used to determine priorities associated with the security incidents. Alerts may then be generated based on the determined priorities. The determined priorities may be inversely correlated (e.g., inversely proportional) to the remaining defense ratings. This is because the remaining defense rating may represent the estimated difficulty required for an unauthorized person to advance from a respective checkpoint to a respective protected asset. For example, consider a scenario in which security breaches occur simultaneously at the first, second and third checkpoints. In this scenario, the security breach at the third checkpoint may be given the highest priority, the security breach at the second checkpoint may be assigned the second highest priority, and the security breach at the first checkpoint may be assigned the third highest priority. Thus, an administrator may be notified of the security breach at the third checkpoint with the highest priority, to allow the administrator to address this security breach (e.g., by sending guards, locking down intervening checkpoints if any, etc.) before the other security breaches. For example, an alert of the security breach at the third checkpoint may be sent with greater urgency (e.g., sent first in time, sent to a higher priority address or via a higher priority communications medium) than alerts of the other security breaches.

In some examples, access dependencies between security checkpoints may also be used for other management purposes, such as to make intelligent decisions about identity data caching, referred to herein as just-in-time identity data caching. In many conventional security systems, identity verification data may be stored (e.g., cached) in local data stores that are locally accessible to respective identity verification devices (e.g., badge readers). For example, an identity verification device may be able to retrieve data from a respective local data store without the need to communicate via the Internet. One advantage of this local caching of identity verification data is that it may enable security systems to be resilient to Internet and other network outages. However, in many cases, there may be large quantities of people that may potentially enter or exit though a given security checkpoint at any given time. In some cases, this may be particularly applicable to large organizations/companies with large quantities of employees. Thus, in some conventional security systems, large quantities of identity verification data may be cached at local checkpoint data stores, such as to account for the large quantity of people that may potentially enter or exit through a security checkpoint. The need to locally store this large quantity of data may raise the cost and complexity of implementing security systems, such as by requiring larger and more complex local data storage systems.

According to the techniques described herein, a just-in-time intelligent data caching strategy may be employed, such as to reduce the cost and complexity of these security systems. The just-in-time data caching strategy may include analyzing checkpoint physical relationship data to determine one or more dependent checkpoints whose access is dependent on entering another checkpoint. As described above, one common example of this is in the context of a company that owns a building that has a first checkpoint in the building lobby and a second checkpoint at the entrance to an interior room (e.g., a conference room) within the building. In this example, the second checkpoint is a dependent checkpoint because access to the second checkpoint is dependent upon first entering the lobby checkpoint. In some examples, the lobby checkpoint may locally cache identity verification data for all employees in the company. This is because there is a possibility that any company may potentially enter the building at any given time. However, in contrast to the lobby checkpoint, the interior checkpoint may not locally cache identity data for all employees in the company. Rather, as described herein, the interior checkpoint may cache identity verification data only for individuals that have previously entered through the lobby checkpoint. This is because all people that enter the building are required to pass through the lobby checkpoint. Thus, a person cannot access the interior checkpoint unless they have first passed through the lobby checkpoint. This caching strategy may allow a reduction in the quantity of data that needs to be cached locally to the interior checkpoint, thereby potentially lowering the cost and complexity of the security system.

Additionally, in some examples, the just-in-time caching strategy may also be used as an extra layer of security within the system. For example, consider a scenario in which a first employee has been granted permission to access the interior room that is protected by the interior checkpoint. Also suppose that a second employee has not been granted permission to access the interior room. Now suppose that the second employee wishes to obtain access to the interior room. For example, suppose that the second employee is being paid off be a rival company to obtain confidential data that is stored in the interior room. In some scenarios, the second employee could temporarily steal the first employee's access badge, and the second employee could then use the first employee's access badge to improperly gain access to the interior room. For example, the second employee could use his own security badge to enter the building lobby, and the second employee could then use the first employee's stolen security badge to then improperly gain access to the interior room—even though the first employee may not be in the building. In some examples, the just-in-time caching strategy may be able to detect this type of improper access. For example, if the first employee is not in the building and his badge is not used to enter the building lobby, then the first employee's identity verification data will not be cached locally at the interior checkpoint. In this scenario, when the second employee improperly presents the first employee's badge at the interior checkpoint, the second employee will be denied access to the interior room because the first employee's badge will not correlate to any locally cached identity verification data.

FIG. 1 is a diagram illustrating an example security checkpoint relationship building system that may be used in accordance with the present description. As shown in FIG. 1, an example security infrastructure 100 may include a plurality of checkpoints 103A-N that may be used to control and restrict access to various locations and/or assets. A checkpoint, as that term is used herein, refers to one or more components that control access to a location and/or asset based on a person's identity information. The checkpoints 103A-N may be at various locations throughout one or more buildings, such as at front doors, building lobbies, entrances to building floors, entrances to rooms and/or assets within a room, and at other locations. The checkpoints 103A-N may include identity verification devices 101A-N, respectively. In one specific example, the identity verification devices 101A-N may be badge readers that are configured to read badges representative of people's identities, for example employees of a business or other organization. In some examples, the identity verification devices 101A-N may include electronic data reading devices, such as bar code readers, biometric readers, and/or other data readers. The identity verification devices 101A-B may have access to stored identity data for people that are authorized to access a given location. In some examples, in order to gain access to a given location, a person may present identity data (e.g., that is read from a badge) to an identity verification device 101A-N. The identity verification device 101A-N may then attempt to match the presented identity information to stored identity information for a person that is authorized to access the location. If the identity verification device 101A-N is able to detect a match, then the person may be granted access to the location (e.g., by unlocking and/or opening a door, gate, etc.). For example, in some cases, when an identity verification data match is confirmed, one or more signals may be sent to locking components to unlock a door that provides access to a room. By contrast, if the identity verification device 101A-N is unable to detect a match, then the person may be denied access to the location. In some examples, when an unauthorized person attempts to access a given location (either successfully or unsuccessfully), this may be indicative of a security event, and an alert may be generated.

Logs 122 may be generated to provide a historical record of individuals that enter and/or exit through checkpoints 103A-N. The logs 122 may store log entries. In some examples, each log entry may include information such as an identity (e.g., name) of a person entering and/or exiting a checkpoint 103A-N, a time of the entrance or exit, an indication of the respective checkpoint location (e.g., building name, floor number, room number, etc.) and/or other related information.

In this example, cameras 102A-N obtain video 104A-N, respectively, of people entering and/or exiting through checkpoints 103A-N, respectively. It is desirable for users to know which cameras 102A-N capture video 104A-N of which checkpoints 103A-N. This knowledge may allow users to easily find and view video footage to investigate security events. In some cases, administrators of a system may manually identify associations between a checkpoint 103A-N and a corresponding camera 102A-N. In some cases, however, such as when system administrators do not take the time to manually identify associations between checkpoints 103A-N and cameras 102A-N, it may be unclear which camera 102A-N is capturing video 104A-N from which checkpoint 103A-N. For example, a user may wish to view security footage from checkpoint 103B. However, in order to do this, the user may first need to know that camera 102B is the camera that provides video of checkpoint 103B.

Relationship builder 123 is a computing component that may automatically identify associations between cameras 102A-N and checkpoints 103A-N based on a computer-executed analysis of logs 122 and video 104A-N. For example, in some cases, video 104A-N may be analyzed via computer-based image processing techniques to determine times at which people enter and/or exit through a checkpoint 103A-N. In some examples, the video 104A-N may be analyzed using computer-based object recognition techniques, such as to detect human faces and/or other body parts within in the video 104A-N, thereby indicating that a person is entering or exiting through a checkpoint 103A-N that is within the field of view of a camera 102A-N. In some cases, frames within the video 104A-N may be timestamped, such as to allow a correlation between a given frame and the time it was captured by the camera 102A-N. Additionally, the logs 122 may also be analyzed to identify times at which people entered and/or exited the checkpoints 103A-N. Amounts of correlation may then be determined between the enter and/or exit times in the video 104A-N relative to the enter and/or exit times in the logs 122. As an example, camera 102A may be matched to a checkpoint 103A with which the camera 102A shares the highest amount of correlation between enter and/or exit times in video 104A and logs 122. In some examples, a correlation of times in the video 104A and logs 122 may be required to exceed a threshold amount (e.g., percentage and/or quantity of correlated times, etc.) in order for camera 102A to be associated with checkpoint 103A.

Video 104A-N and/or logs 122 may also be used by relationship builder 123 to determine physical relationship data 125 that indicates physical relationships between security checkpoints 103A-N. In some examples, the determined physical relationships may include a distance between two of checkpoints 103A-N and/or an access dependency between two of checkpoints 103A-N. An access dependency, as that term is used herein, refers to a physical relationship in which a person must enter through a first checkpoint prior to entering a second checkpoint. In this scenario, access to the second checkpoint is dependent upon access to the first checkpoint. Access to a second checkpoint is dependent on entering a first checkpoint when a person must enter through the first checkpoint prior to entering the second checkpoint. As described herein, in order to enter through the first checkpoint, the person may be required to present identity verification data that matches stored reference identity verification data. One common example of this is in the context of a building that has a first checkpoint in the building lobby and a second checkpoint at the entrance to an interior room (e.g., a conference room) within the building. In this example, in order for a person to access the interior room, the person's identity must be validated by the second security checkpoint. However, prior to arriving at the second security checkpoint, the person must first enter through the building lobby and successfully pass through the first security checkpoint, such as by presenting identity verification data that matches stored reference identity verification data. In this example, access to the second checkpoint is dependent on entering the first checkpoint.

To determine physical relationships between security checkpoints 103A-N, relationship builder 123 may analyze video 104A-N and/or logs 122 to identify times at which people entered and/or exited through each checkpoint 103A-N. These entrance and/or exit times may then be used to determine common checkpoint access sequences. For example, in some cases, if the checkpoint history data indicates that each person that has entered Checkpoint 103B has also previously entered Checkpoint 103A, then it may be determined that access to Checkpoint 103B is dependent on entering Checkpoint 103A. Additionally, the video 104A-N and/or logs 122 may be analyzed to determine an average time difference between the times at which Checkpoints 103A and 103B were accessed. In one specific example, it may be determined that, on average, that Checkpoint 103A was accessed thirty seconds before Checkpoint 103B. In some examples, the average access time difference may be divided by an estimated human walking speed to in order to determine an estimated distance between checkpoints. For example, in some cases, it may be assumed that the average human walks at a speed of 1.5 meters per second. Accordingly, in this example, the estimated distance between Checkpoints 103A and 103B may be determined to be twenty meters (thirty seconds divided by 1.5 meters per second). In some examples, the physical relationship data may include a checkpoint diagram that represents the determined physical relationships (e.g., distances and/or access dependencies) between security checkpoints.

In some examples, the relationship builder 123 may repeatedly analyze logs 122, video 104A-N and/or other information to detect changes in the physical relationships between checkpoints 103A-N. These changes may occur, for example, when new checkpoints are added, when existing checkpoints are removed or modified, or when a building is remodeled, such as by creating new entrances and exits, removing entrances and exits, merging and diving rooms, and many other changes. In some examples, the physical relationship data 125 may be modified as necessary to represent the changes in physical relationships between the checkpoints 103A-N.

Figure 2:
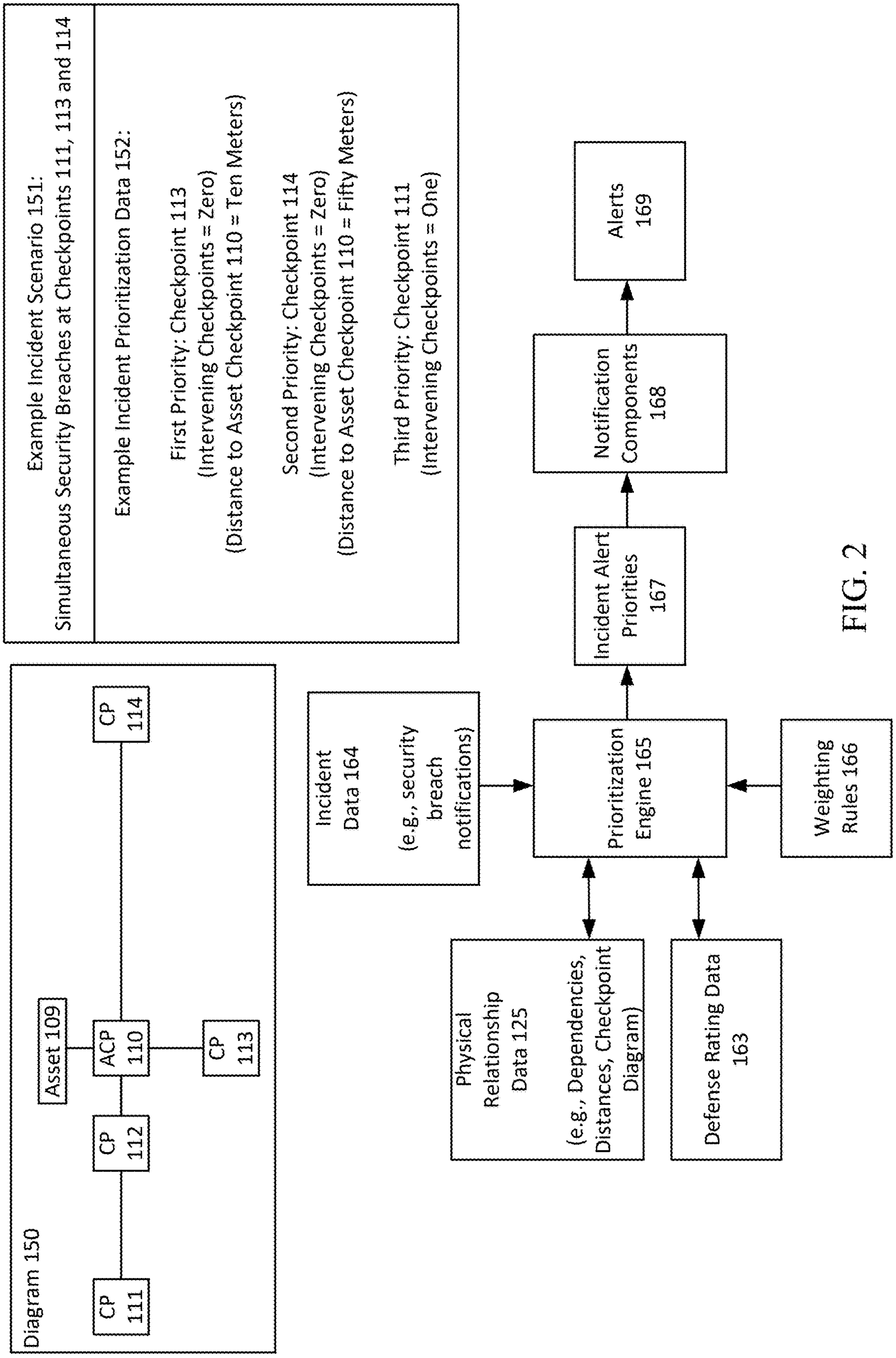
FIG. 2 is a diagram illustrating an example security-related incident alert prioritization system that may be used in accordance with the present description.

FIG. 2 is a diagram illustrating an example security-related incident alert prioritization system that may be used in accordance with the present description. In some examples, the determined physical relationships between security checkpoints may be used to prioritize notifications of security incidents (e.g., a security breaches) occurring at different security checkpoints. As shown in FIG. 2, diagram 150 shows physical relationships between asset 109, asset checkpoint (ACP) 110 and checkpoints (CPs) 111-114. Asset 109 is a protected asset. In this example, asset 109 is directly protected by asset checkpoint 110. The term directly protected, as used herein, means that there are no intervening security checkpoints between the asset checkpoint 110 and the asset 109. For example, in some cases, the asset checkpoint 110 may be located at the entrance to a room that contains the asset 109. As described above with reference to FIG. 1, logs 122 and/or video 104A-N may be used to determine physical relationship data 125, for example including checkpoint distance and dependency data. As shown in FIG. 2, the physical relationship data 125 may be used to determine a remaining defense rating for each checkpoint 111-114 relative to the protected asset. The remaining defense rating may indicate the amount of defensive security for a checkpoint 111-114 relative to the asset 109. The remaining defense ratings may be calculated by prioritization engine 165 and may be stored within defense rating data 163.

In some examples, the remaining defense rating may be calculated based on a weighted hierarchy of physical relationships, such as may be specified in weighting rules 166. In one specific example, a number of intervening security checkpoints relative to the asset 109 may be a first-highest weighted physical relationship in the weighted hierarchy of physical relationships. Additionally, a distance between security checkpoints may be a second-highest weighted physical relationship in the weighted hierarchy of physical relationships. For example, the distance between security checkpoints may be used as a tiebreaker when two checkpoints have the same number of intervening security checkpoints relative to the asset 109. As shown in diagram 150, there is one intervening checkpoint (checkpoint 112) between checkpoint 111 and the asset checkpoint 110. Additionally, there are zero intervening security checkpoints between checkpoint 113 and the asset checkpoint 110. Furthermore, there are also zero intervening security checkpoints between checkpoint 114 and the asset checkpoint 110. In this scenario, checkpoint 111 may have a higher remaining defense rating than any of checkpoints 112-114. This is because checkpoint 112 intervenes between checkpoint 111 and asset checkpoint 110. Thus, checkpoint 111 has more intervening security checkpoints (one) than any of checkpoints 112-114 have (zero) relative to the asset 109. Moreover, suppose that checkpoint 114 is fifty meters from the asset checkpoint 110. Additionally, suppose that checkpoint 113 is ten meters from the asset checkpoint 110. Furthermore, suppose that checkpoint 112 is eight meters from the asset checkpoint 110. In this example, the distance may be used as a tiebreaker between checkpoints 112-114. Specifically, checkpoint 114 may have a higher remaining defense rating than checkpoint 113 because checkpoint 114 is further away from the asset checkpoint 110 (fifty meters) than checkpoint 113 is from asset checkpoint 110 (ten meters). Additionally, checkpoint 113 may have a higher remaining defense rating than checkpoint 112 because checkpoint 113 is further away from the asset checkpoint 110 (ten meters) than checkpoint 112 is from asset checkpoint 110 (eight meters). In some examples, the remaining defense rating may be indicated using any of a variety of formats, such as numeric scores/values, rankings, rating levels (e.g., high, moderate, low, etc.), and/or other formats. In one specific example, the remaining defense rating may be a numeric value (e.g., score) calculated as a function of a number of intervening checkpoints (if any) between a respective checkpoint and an asset checkpoint that directly protects an asset and/or distances between checkpoints (e.g., distances between the respective checkpoint and the asset checkpoint and/or intervening checkpoints). For example, each additional intervening checkpoint may increase the rating score by one or more configurable amounts. Additionally, distances between checkpoints may also be considered either as tiebreakers or as part of the scoring formula, for example with longer distances increasing the score and/or rating. In some examples, any number of other factors may also optionally be considered, such as the presence of security guards at certain locations, and the like.

When security incidents (e.g., a security breaches) occur at one or more security checkpoints, the security incidents may be reported to the prioritization engine 165 as incident data 164. The prioritization engine 165 may use the remaining defense ratings in defense rating data 163 to determine incident alert priorities 167 associated with the security incidents. Alerts 169 may then be generated based on the determined incident alert priorities 167. The determined incident alert priorities 167 may be inversely correlated (e.g., inversely proportional) to the remaining defense ratings. This is because the remaining defense ratings represent the estimated difficulty required for an unauthorized person to advance from a respective checkpoint to the asset 109. For example, in some cases, when a security incident occurs at a given checkpoint with a high remaining defense rating, the security incident may be assigned a low incident alert priority. By contrast, in some cases, when a security incident occurs at a given checkpoint with a low remaining defense rating, the security incident may be assigned a high incident alert priority. For example, in some cases, the lower the remaining defense rating is for a checkpoint, the higher the checkpoint's incident alert priority may be. By contrast, in some cases, the higher the remaining defense rating is for a checkpoint, the lower the checkpoint's incident alert priority may be. For example, consider an example incident scenario 151 in which security breaches occur simultaneously at checkpoints 111, 113 and 114. As shown in example incident prioritization data 152, the security breach at checkpoint 113 may be given the first (e.g., highest) priority, the security breach at checkpoint 114 may be assigned the second priority, and the security breach at checkpoint 111 may be assigned the third (e.g., lowest) priority. This is because checkpoint 111 has a higher remaining defense rating than checkpoint 114, and checkpoint 114 has a higher remaining defense rating than checkpoint 113. As described above, checkpoint 111 has a higher remaining defense rating than checkpoint 114 because checkpoint 111 has more intervening security checkpoints (one) than checkpoint 114 has (zero) relative to the asset 109. As also described above, checkpoint 114 has a higher remaining defense rating than checkpoint 113 because checkpoint 114 is further away from the asset checkpoint 110 (fifty meters) than checkpoint 113 is from asset checkpoint 110 (ten meters). Thus, in some examples, the incident alert priorities for simultaneous security breaches at a group of checkpoints may be determined based on an inverse (e.g., an inverse ranking) of the remaining defense ratings for those checkpoints. Upon being determined by prioritization engine 165, these incident alert priorities 167 may be provided to notification components 168. The notification components 168 may then generate alerts 169 based on the incident alert priorities 167. Thus, an administrator may be notified of the security breach at checkpoint 113 with the highest priority, to allow the administrator to address this security breach (e.g., by sending guards to checkpoint 113, etc.) before the other security breaches. For example, an alert of the security breach at checkpoint 113 may be sent with greater urgency (e.g., sent first in time, sent to a higher priority address or via a higher priority communications medium) than alerts of the other security breaches at checkpoints 111 and 114.

In some examples, the remaining defense rating for a given checkpoint relative to a given asset may change over time. For example, in some cases, a remaining defense rating may change when an asset is moved from one location to another. In one specific example, a remaining defense rating may be increased when an asset is moved further away from a given checkpoint. In yet other examples, a remaining defense rating may change when checkpoints are added or removed. In one specific example, a remaining defense rating for a given checkpoint may be increased when a new intervening checkpoint is added between the given checkpoint and the protected asset. In another specific example, a remaining defense for a given checkpoint may be decreased when an existing intervening checkpoint is removed between the given checkpoint and the protected asset. The remaining defense ratings may also be modified based on other changes, such as building remodeling events (e.g., adding doors and hallways, merging or splitting rooms, etc.).

Figure 3:
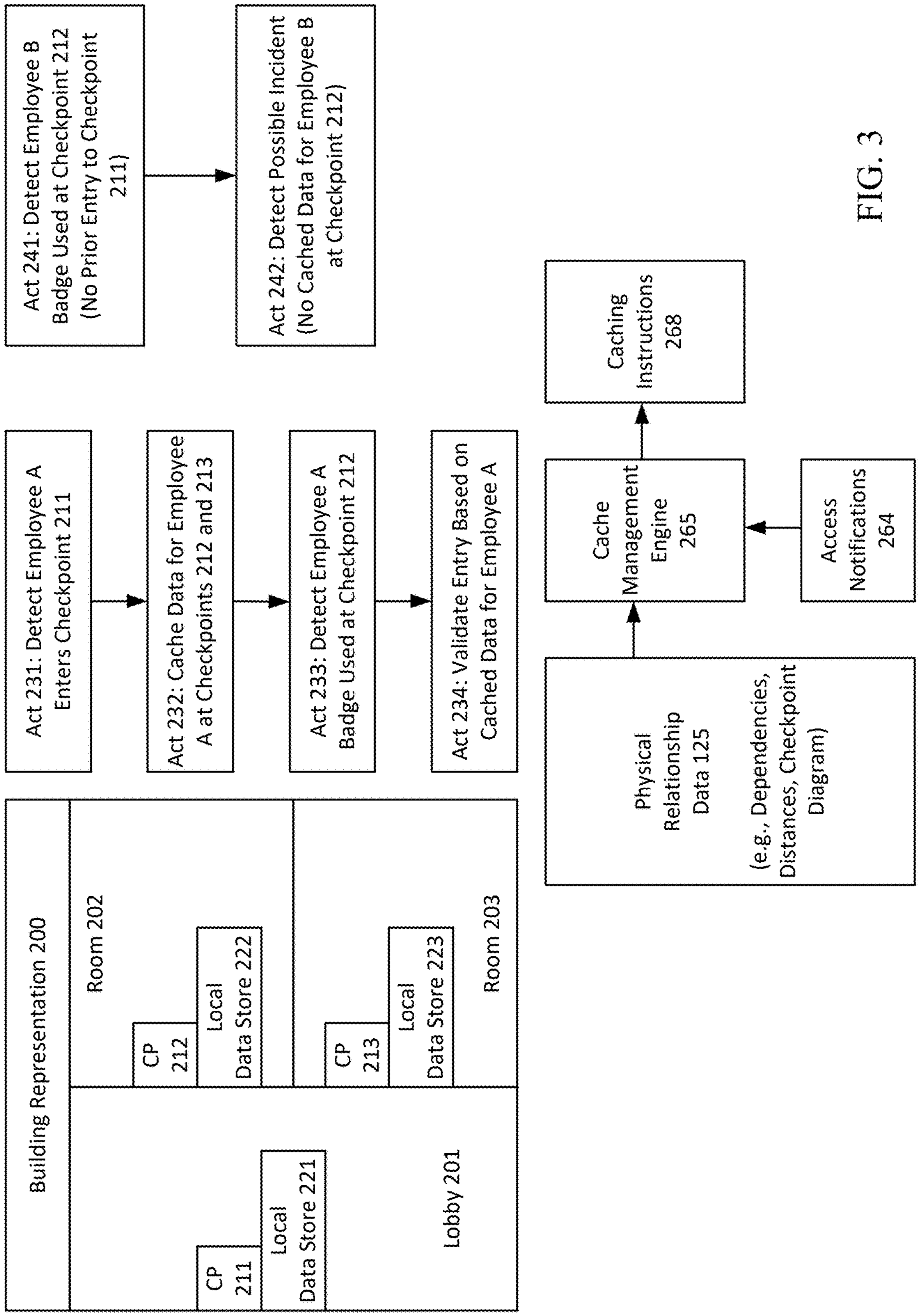
FIG. 3 is a diagram illustrating an example just-in-time identity verification data caching system that may be used in accordance with the present description.

In some examples, physical relationship data 125 (e.g., including access dependencies and distances between security checkpoints, etc.) may also be used for other management purposes, such as to make intelligent decisions about identity data caching, referred to herein as just-in-time identity data caching. FIG. 3 is a diagram illustrating an example just-in-time identity verification data caching system that may be used in accordance with the present description. FIG. 3 shows a building representation 200 that represents a building (e.g., an office building) owned by Company X. The building includes a lobby 201 and two rooms 202 and 203. The lobby 201 has a checkpoint 211. All people must pass through checkpoint 211 to enter the lobby 201. Additionally, all people that enter the building must enter through the lobby 201, for example via a front door included in the lobby 201. Thus, all people that enter the building must pass through checkpoint 211. Room 202 has a checkpoint 212. All people must pass through checkpoint 212 to enter room 202. Room 203 has a checkpoint 213. All people must pass through checkpoint 213 to enter room 203.

Local data stores 221-223 store (e.g., cache) identity verification data for checkpoints 211-213, respectively. Local data stores 221-223 are locally accessible to checkpoints 211-213, respectively. For example, respective identity verification devices at checkpoints 211-213 may be able to retrieve data from local data stores 221-223, respectively, without the need to communicate via the Internet. One advantage of this local caching of identity verification data is that it may enable security systems to be resilient to Internet and other network outages.

According to the techniques described herein, a just-in-time intelligent data caching strategy may be employed, such as to reduce the cost and complexity of security systems. The just-in-time data caching strategy may include analyzing physical relationship data 125 to determine one or more dependent checkpoints whose access is dependent on entering another checkpoint. In the example of FIG. 3, checkpoint 212 (in room 202) is dependent on checkpoint 211 (in lobby 201). This is because all people are required to enter the lobby 201 prior to entering room 202. Additionally, checkpoint 213 (in room 203) is dependent on checkpoint 211 (in lobby 201). This is because all people are required to enter the lobby 201 prior to entering room 203. In some examples, checkpoint 211 in lobby 201 may locally cache identity verification data for all employees in Company X. This is because there is a possibility that any employee in Company X company may potentially enter the building at any given time. However, in contrast to the checkpoint 211, the checkpoints 212-213 in rooms 202-203 may not locally cache identity data for all employees in the Company X. Rather, as described herein, the checkpoints 212-213 may cache identity verification data only for individuals that have previously entered through the checkpoint 211. This is because all people that enter the building are required to pass through the checkpoint 211. Thus, a person cannot access checkpoints 212-213 unless the person has first passed through the checkpoint 211. This caching strategy may allow a reduction in the quantity of data that needs to be cached locally to checkpoints 212 and 213 at local data stores 222 and 223, respectively, thereby potentially lowering the cost and complexity of the security system.

In some examples, a cache management engine 265 may analyze physical relationship data 125 to determine that checkpoint 211 is not dependent on any other checkpoint. Based on this determination, the cache management engine 265 may send caching instructions 268 to checkpoint 211, which may include instructions for checkpoint 211 to obtain and locally cache identity verification data for all employees in Company X. Additionally, cache management engine 265 may analyze physical relationship data 125 to determine that checkpoints 212 and 213 are dependent on checkpoint 211. Based on this determination, cache management engine may send instructions to checkpoints 212 and 213 to obtain and locally cache identity verification data for a person only after that person has entered through checkpoint 211. Cache management engine 265 may receive access notifications 264, which may include notifications of the identifies of people that enter and/or exit through checkpoint 211. Based on these access notifications 264, cache management engine 265 may send caching instructions 268 to checkpoints 212 and 213. For example, when Employee X enters through checkpoint 211, cache management engine 265 may send caching instructions 268 to checkpoints 212 and 213, which may include instructions to obtain and locally cache identity verification data for Employee X.

In some examples, the cache management engine 265 may also receive access notifications when Employee X exits via checkpoint 211 to leave the building. In some cases, when Employee X exits via checkpoint 211 to leave the building, cache management engine 265 may send instructions to checkpoints 212 and 213 to delete the identity verification data for Employee X from local storage in local data stores 222 and 223, respectively. Also, in some examples, the identity verification data for Employee X may be stored in local data stores 222 and 223 for a configurable time period after Employee X enters checkpoint 211. The identity verification data for Employee X may then be deleted upon expiration of the configurable time period. In one specific example, the configurable time period may be twenty-four hours. Additionally, in some examples, the identity verification data for Employee X may be deleted from local data stores 222 and 223 at an occurrence of a set time, such as when the building closes at the end of a workday (e.g., at 5:00 in the evening).

In some cases, a given checkpoint may be dependent upon multiple checkpoints. This means that, prior to accessing the given checkpoint, a person must first pass through one of the multiple checkpoints on which the given checkpoint depends. In these scenarios, the given checkpoint may obtain and cache data for a person whenever the person passes through one of the checkpoints on which the given checkpoint depends. For example, in some cases, there could be two (or more) checkpoints that allow access to the lobby 201. This could occur when there are multiple entrances to lobby 201 and each of the multiple entrances has its own respective checkpoint. In this case, checkpoints 212 and 213 may be dependent upon all of these lobby checkpoints. In this scenario, any time that a given employee passes through one of the lobby checkpoints, the employee's data would be obtained and locally cached at checkpoints 212 and 213.

Furthermore, in some examples, the just-in-time caching strategy may also be used as an extra layer of security within the system. For example, consider a scenario in which a first employee has been granted permission to access the interior room that is protected by the interior checkpoint. Also suppose that a second employee has not been granted permission to access the interior room. Now suppose that the second employee wishes to obtain access to the interior room. For example, suppose that the second employee is being paid off be a rival company to obtain confidential data that is stored in the interior room. In some scenarios, the second employee could temporarily steal the first employee's access badge, and the second employee could then use the first employee's access badge to improperly gain access to the interior room. For example, the second employee could use his own security badge to enter the building lobby, and the second employee could then use the first employee's stolen security badge to then improperly gain access to the interior room—even though the first employee may not be in the building. In some examples, the just-in-time caching strategy may be able to detect this type of improper access. For example, if the first employee is not in the building and his badge is not used to enter the building lobby, then the first employee's identity verification data will not be cached locally at the interior checkpoint. In this scenario, when the second employee improperly presents the first employee's badge at the interior checkpoint, the second employee will be denied access to the interior room because the first employee's badge will not correlate to any locally cached identity verification data.

Some examples of how the just-in-time caching techniques may be employed to allow and restrict access are also shown in FIG. 3. Acts 231-234 show an example of how the just-in-time caching techniques may be employed to allow access. At act 231, the cache management engine 265 may detect that Employee A enters checkpoint 211. The cache management engine 265 may then send instructions to checkpoints 212 and 213 to obtain and locally cache identity verification data for Employee A. At act 232, checkpoints 212 and 213 may obtain and locally cache identity verification data for Employee A. At act 233, checkpoint 212 may detect that the badge of Employee A is used to enter checkpoint 212. At act 234, the entry into checkpoint 212 (and room 202) may be validated by matching the badge data of Employee A to the cached identity verification data for Employee A.

Acts 241-242 show an example of how the just-in-time caching techniques may be employed to restrict access. At act 241, checkpoint 212 detects that the badge of Employee B is used to attempt to enter checkpoint 212. In this example, the badge of Employee B is not used to enter checkpoint 211 prior to being used at checkpoint 212. Thus, identity verification data for Employee B is not cached at checkpoint 213. Accordingly, at act 242, a possible incident is detected because the badge data for Employee B will not be matched to any identity verification data that is cached locally at local data store 223 for checkpoint 213.

Figure 4:
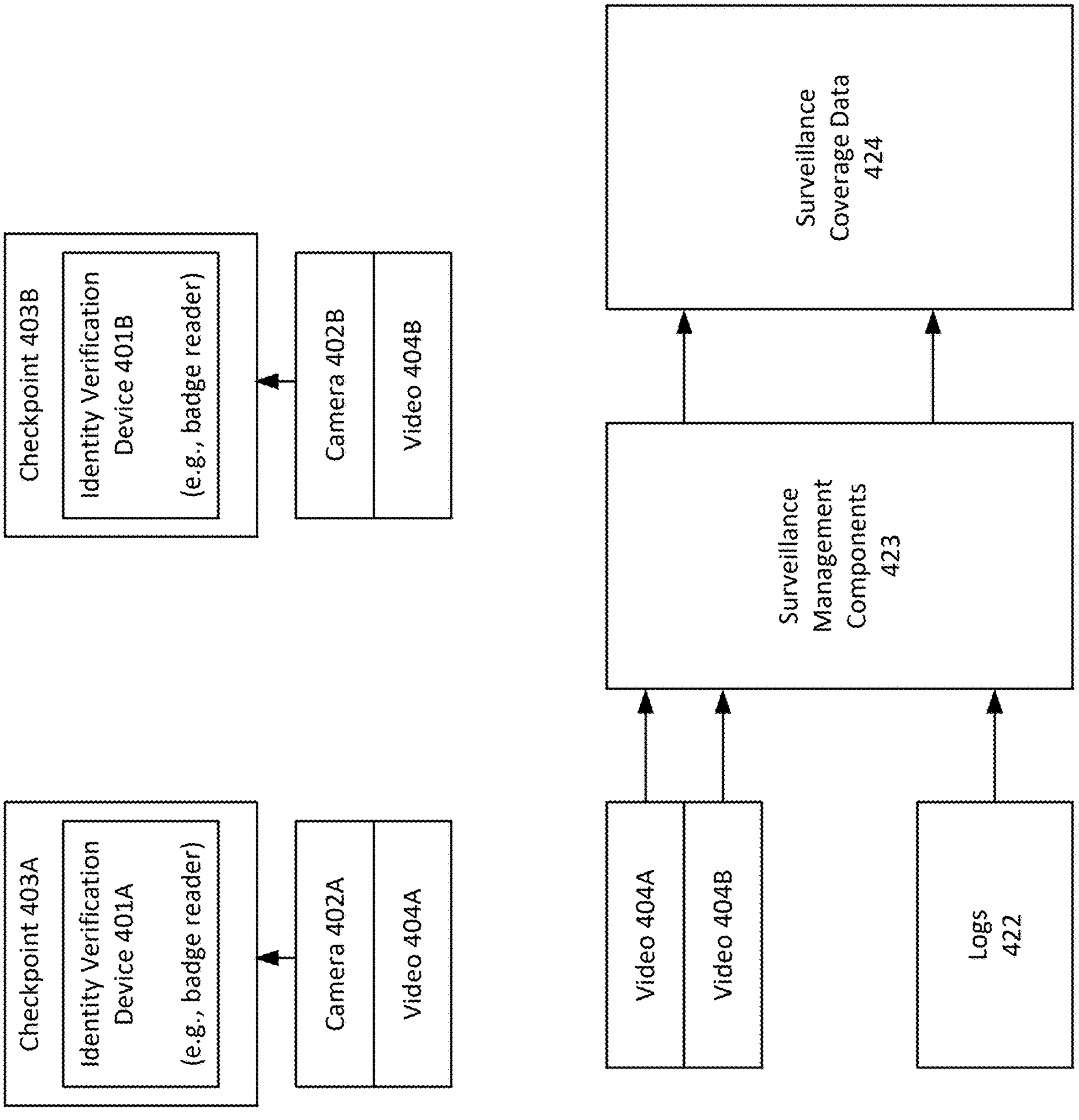
FIG. 4 is a diagram illustrating an example surveillance coverage determination system that may be used in accordance with the present description.

FIG. 4 is a diagram illustrating an example surveillance coverage determination system that may be used in accordance with the present description. In the example of FIG. 4, checkpoints 403A-B may include identity verification devices 401A-B, respectively. In one specific example, the identity verification devices 401A-B may be badge readers that are configured to read badges representative of people's identities, for example employees of a business or other organization. Cameras 402A-B obtain video 404A-B, respectively, of people entering and/or exiting through checkpoints 403A-B, respectively. Logs 422 may be generated to provide a historical record of individuals that enter and/or exit through checkpoints 403A-B. The logs 422 may store log entries. In some examples, each log entry may include information such as an identity (e.g., name) of a person entering and/or exiting a checkpoint 403A-B, a time of the entrance or exit, an indication of the respective checkpoint location (e.g., building name, floor number, room number, etc.) and/or other related information.

In the example of FIG. 4, surveillance management components 423 may use logs 422 and video 404A-B to determine surveillance coverage data 424 for cameras 402A-B. Specifically, in some examples, surveillance coverage data 424 may include information regarding estimated surveillance coverage areas for cameras 402A-B. In some examples, to make these determinations, surveillance management components 423 may analyze logs 422 to determine a time difference between accessing of identity verification devices 401A-B. For example, in some cases, logs 422 may indicate that each person that entered checkpoint 403A subsequently entered checkpoint 403B approximately ten seconds after entering checkpoint 403A. Based on this information, surveillance management components 423 may determine that the access time difference between checkpoints 403A and 403B is ten seconds. Suppose that checkpoint 403A is located at a first door that is at one end of a hallway. Also suppose that checkpoint 403B is located at a second door that is at an opposite end of a hallway. In this example, people may enter the hallway through the first door at checkpoint 403A and them exit the hallway through the second door at checkpoint 403B. It may therefore be determined that it takes people approximately ten seconds to walk across this hallway from the first door to the second door.

In some examples, surveillance management components 423 may analyze video 404A from camera 402A to determine how long each person that entered checkpoint 403A remains in video 404A after passing through checkpoint 403A. For example, suppose that each person that enters the hallway by opening the first door remains in the video 404A for approximately two seconds after they open the first door and start walking across the hallway. This means that it takes each person approximately two seconds to walk from the first door to the edge of the field of view of camera 402A.

Additionally, in some examples, surveillance management components 423 may analyze video 404B from camera 402B to determine how long each person that entered checkpoint 403B is shown in video 404B prior to exiting the hallway through the second door at checkpoint 403B. For example, suppose that each person that exits the hallway by opening the second door is shown in the video 404B for approximately three seconds before they open the second door and to exit the hallway. This means that it takes each person approximately three seconds to walk from the edge of the field of view of camera 402B to the second door.

Based on this information, the surveillance management components 423 may determine the surveillance coverage areas for cameras 402A and 402B. Specifically, the surveillance management components 423 have determined that it takes people ten seconds to walk from the first door at checkpoint 403A to the second door at checkpoint 403B. Additionally, the surveillance management components 423 have calculated that it takes people two seconds to walk from the first door to the edge of the field of view of camera 402A. Based on this information, the surveillance management components 423 may calculate that camera 402A provides surveillance coverage of twenty percent of the area (e.g., the hallway) between checkpoint 403A and checkpoint 403B. This is because the travel time from checkpoint 403A to the edge of the field of view of camera 402A (two seconds) is twenty percent of the travel time between checkpoints 403A and 403B (ten seconds).

Furthermore, the surveillance management components 423 have calculated that it takes people three seconds to walk from the edge of the field of view of camera 402B to the second door. Based on this information, the surveillance management components 423 may calculate that camera 402B provides surveillance coverage of thirty percent of the area (e.g., the hallway) between checkpoint 403A and checkpoint 403B. This is because the travel time from the edge of the field of view of camera 402A (three seconds) to checkpoint 403B is thirty percent of the travel time between checkpoints 403A and 403B (ten seconds). Thus, the amount of surveillance coverage for cameras 402A-B may be determined based on a ratio of time that a person spends in the field of views of cameras 402A-B relative to the minimum travel time between checkpoints 403A-B.

Figure 5:
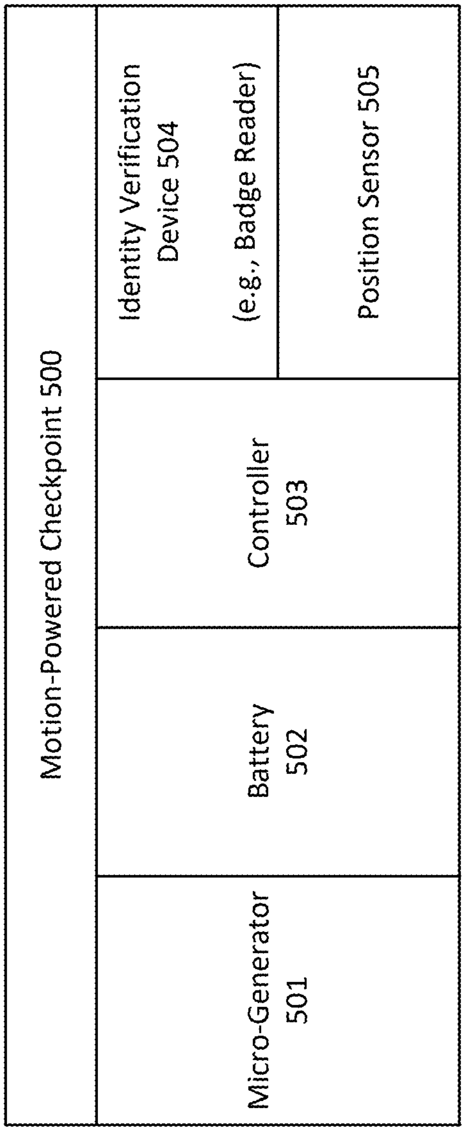
FIG. 5 is a diagram illustrating an example motion-powered checkpoint that may be used in accordance with the present description.

FIG. 5 is a diagram illustrating an example of a motion-powered checkpoint 500 that may be used in accordance with the present description. As shown, motion-powered checkpoint 500 includes a micro-generator 501. The micro-generator 501 may capture kinetic energy created by the movement (e.g., opening and/or closing) of a physical structure that is moved to allowed access to a restricted area. For example, the physical structure may be a door that is opened to allow access to a room for which access is controlled by the motion-powered checkpoint 500. The opening and/or closing of the physical structure (e.g., door) may create kinetic energy, such as by pushing or pulling of the door against a resistive force. The micro-generator 501 may connect to a door spring and/or hinge such as to assist in capturing of the kinetic energy. The micro-generator 501 may include any of a variety of known electrical energy generator components that capture and/or convert kinetic energy into storable electrical energy. The electrical energy captured by the micro-generator 501 may be stored in a battery 502, which may include any of a variety of known battery components that receive, store and provide energy. By harvesting motion from movement of the door or other physical structure, the micro-generator 501 may reduce or eliminate the need to power the checkpoint from external power sources, such as standard wire-based building power provided by an electrical utility. This may eliminate the need for a wire-based connection between the motion-powered checkpoint 500 and external power providing components, such as wall-based electrical power outlets, thereby potentially allowing a simpler installation procedure and also potentially reducing costs for powering the motion-powered checkpoint 500.

The controller 503 is an electrical controller for controlling, and interacting with, an identity verification device 504 and a position sensor 505. The controller 503 may obtain stored energy from the battery 502 and may also provide energy to the identity verification device 504 and the position sensor 505. The controller 503 may also include and/or operate a wireless communication component (e.g., a wireless transmitter/transceiver) for communication with external components, such as security system service computing components. The identity verification device 504 may be, for example, a badge reader that is configured to read badges representative of people's identities, for example employees of a business or other organization. In some examples, the identity verification device 504 may include an electronic data reading device, such as a bar code reader, a biometric reader, and/or another data reader. The identity verification device 504 may have access to stored identity data for people that are authorized to access a given location. In some examples, in order to gain access to a given location, a person may present identity data (e.g., that is read from a badge) to the identity verification device 504. The identity verification device 504 may then attempt to match the presented identity information to stored identity information for a person that is authorized to access the location. In some examples, when the presented identity information matches to stored identity information for a person that is authorized to access the location, the identity verification device 504 may report a valid identity match event to the controller 503.

Position sensor 505 may be located on the physical object (e.g., door) and may detect a position of the physical object. Position sensor 505 may be configured to report position updates/changes to controller 503. Position sensor 505 may include any of a variety of known sensors that measure a position of an object, for example relative to a reference position. In some examples, position sensor 505 may be configured to provide an amount of difference between a current position of the physical object and a reference position of the physical object. In some examples, the amount of difference between the current position and the reference position may be represented using measures such as an amount of degrees and/or an angular difference. In some examples, the reference position may be a fully closed position, and the position sensor may provide an indication of an amount (e.g., amount of degrees) of difference between the current door position and the reference door position. In some other examples, as an alternative to position sensor 505, a magnetic sensor may be employed that detects door closure, such as by sensing metallic components in the door. Thus, the magnetic sensor may provide a binary open or closed indication. However, this binary indication may be susceptible to errors, such as when air shakes the door, and may sometimes fail to properly indicate that a door is open or closed. By contrast, the position sensor 505 may provide a more precise indication of the door position that is more precise than a binary open or close indication. The more precise position indication provided by position sensor 505 may not be susceptible to the same errors as the magnetic sensor that provides only a binary open or close indication. For example, in some cases, there may be a very small space between the door and the wall, and this may not be large enough to allow a person to enter the room. In this case, the magnetic sensor may indicate that the door is open. By contrast, the position sensor 505 could detect the exact amount of degrees of the door opening.

The controller 503 may be configured to receive position indications from position sensor 505 as well as identity verification information from identity verification device 504. For example, in some cases, the controller 503 may be configured to detect door positions that have greater than a threshold amount of difference (e.g., amount of degrees) relative to a reference position (e.g., a closed position). When the controller 503 detects door positions that have greater than a threshold amount of difference (e.g., amount of degrees) relative to a reference position (e.g., a closed position), the controller 503 may be configured to classify this as a door opening event. In some examples, when a door opening event occurs, the controller 503 may be configured to evaluate signals received from identity verification device 504. For example, if a door open event correlates in time with a valid identity match event that is reported by the identity verification device 504, then a valid entry event may be detected by controller 503. The controller 503 may then report this valid entry event to the security system service, for example via a wireless transmission. If, on the other hand, a door open event does not correlate in time with a valid identity match event that is reported by the identity verification device 504, then an invalid entry event may be detected by controller 503. The controller 503 may then report this invalid entry event to the security system service, for example via a wireless transmission. The invalid entry event may be indicative of a security breach or other security-related incident associated with the motion-powered checkpoint 500.

It is noted that the micro-generator 501 may be used in association with door springs/hinges having a variety of tensions that provide a variety of resistive forces. It is also noted that there may be different advantages to different resistive forces. For example, in some cases, a spring that provides a stronger resistive force may be advantageous because it may require a greater amount of energy exertion from a person in order to open (e.g., push or pull) the door, thereby allowing the micro-generator 501 to harvest a larger amount of energy each time that the door is opened. By contrast, in some cases, a spring that provides a weaker resistive force may be advantageous because it may require a lesser amount of energy exertion from a person in order to open the door. In some cases, the weaker resistive force may be better suited for scenarios in which the door is opened by weaker individuals, such as the elderly or people recovering from injuries. In yet other examples, an adjustable spring/hinge may be used that may be dynamically adjusted to apply different amounts of resistive forces, such as by tightening and/or loosening the spring. In some examples, an interface, such as a graphical user interface on a display screen, may be provided that may allow users to adjust the amount of resistive force of the spring. Signals representing these adjustments may be sent from the interface/display to the controller 503, which in turn may send signals to the spring to adjust the resistance, such as by tightening or loosening the spring. In one specific example, the spring may be tightened to provide a greater amount of resistive force and loosened to provide a lesser amount of resistive force. For example, in some cases, the resistive force could be lessened to allow the door to be opened by an injured person, and the resistive force could then be increased to harvest greater amounts of energy. In yet other examples, the controller 503 could monitor data from position sensor 505 to detect when an individual is struggling to open the door (e.g., when the position data indicates that the door has remained partially opened for several seconds). The controller 503 could then send a signal to the spring to reduce the amount of resistive force, such as by loosening the spring, thereby allowing the person to fully open the door.

Figure 6:
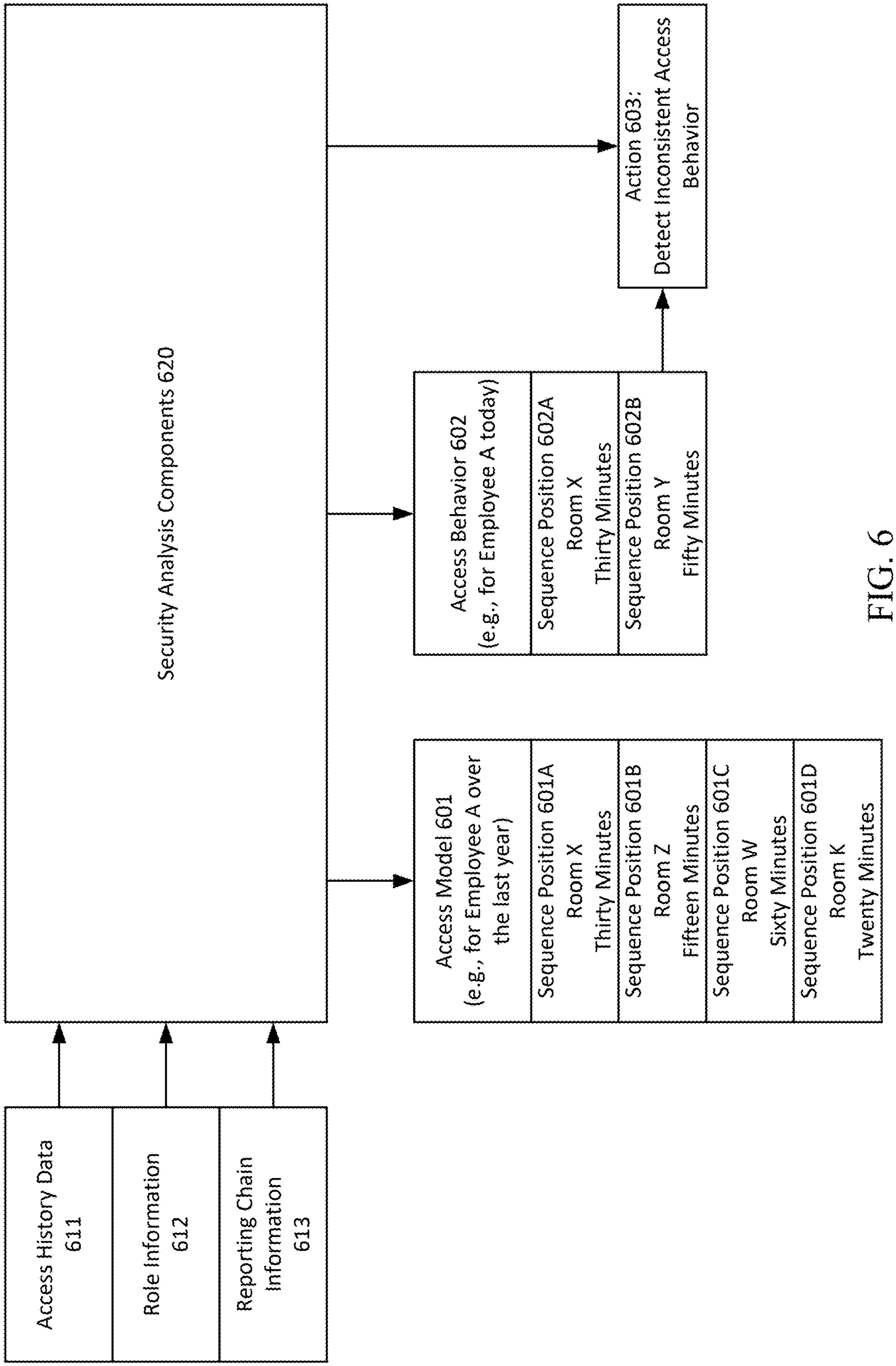
FIG. 6 is a diagram illustrating an example access model analysis system that may be used in accordance with the present description.

FIG. 6 is a diagram illustrating an example access model analysis system that may be used in accordance with the present description. A checkpoint access model, as that term is used herein, is a model that indicates a historical checkpoint access pattern, including checkpoint access sequence information and/or checkpoint access timing information (e.g., access times and/or access durations). The checkpoint access timing information may include, for example, access times (e.g., times at which a person enters a location for which access is controlled by a respective checkpoint) and/or access durations (e.g., an amount of time that a person spends at a location for which access is controlled by a respective checkpoint). In the example of FIG. 6, access history data 611, such as security checkpoint access logs, may be analyzed by security analysis components 620 to generate an access model 601 for one or more identities, such as one or more employees of an organization. The access model 601 is a checkpoint access model that indicates a security checkpoint access pattern corresponding to one or more identities. In this example, the access model 601 indicates a sequence in which security checkpoints are repeatedly accessed over time by the one or more identities. Additionally, the access model 601 indicates a duration (e.g., an approximate and/or average duration) of time for which the one or more identities remain present at locations corresponding to the security checkpoints. In some examples, the access model 601 may correspond to a single person, and the access model 601 may be based on an access history for the single person. In some examples, the access model 601 may also include additional information, such as video (and/or links to video) of one or more people entering and/or exiting one or more checkpoints at one or more dates and times. In other examples, if a person interacts with a given asset at a given room/location identified within the access model 601, the access model 601 may include data (and/or links to data) associated with this interaction. For example, if a person logs-on to a computer in a given room/location, the asset model 601 may include details of the interaction, such as a log-on time, web pages or other resources accessed during the computing session, and the like.

Additionally, in some examples, the access model 601 may correspond to a group of people, such as a group of people having a same role and/or reporting chain within an organization. In some examples, the security analysis components 620 may receive role information 612, which may indicate roles for one or more people within an organization. A role may be, for example, a job or task type, such as custodian, doctor, lawyer, administrator, engineer, teacher, student, security guard, salesperson, etc. The role information 612 may be used to assist in matching an access model to a corresponding role. For example, it may be detected that all people that have an access history pattern that correlates to access model 601 are also janitors that work for Company X. Additionally, it may be detected that all janitors that work for Company X have an access history pattern that correlates to access model 601. Based on this information, it may be determined that access model 601 corresponds to janitors that work for Company X. In some examples, different access models may be created for other roles within Company X. Furthermore, in some examples, the security analysis components 620 may receive reporting chain information 613, which may indicate reporting chains for one or more people within an organization. The reporting chain information 613 may include, for example, information about a person's superior (e.g., boss, teacher, mentor, etc.). The reporting chain information 613 may also include information about a location to which a person reports for work (e.g., city, building number, etc.). The reporting chain information 613 may be used to assist in matching an access model 601 to a corresponding reporting chain.

In the example of FIG. 6, access model 601 indicates a sequence in which different security checkpoints are accessed. The sequence includes sequence positions 601A-D. In this example, sequency position 601A is accessed first. Sequence position 601A is followed by sequence position 601B. Sequence position 601B is followed by sequence position 601C. Sequence position 601C is followed by sequence position 601D. This means that a corresponding identity will first go to Room X at sequence position 601A. After going to Room X, the identity will then go to Room Z at sequence position 601B. After going to Room Z, the identity will then go to Room W at sequence position 601C. After going to Room W, the identity will then go to Room K at sequence position 601D. In this example, the access model 601 also indicates a duration of time spent at each location. Specifically, the identity remains in Room X for thirty minutes, the identity remains in Room Z for fifteen minutes, the identity remains in Room W for sixty minutes, and the identity remains in Room X for twenty minutes.

In some examples, the security analysis components 620 may use access model 601 to detect an inconsistent access behavior for a given identity. For example, consider a scenario in which access model 601 corresponds to a historical access pattern for Employee A over the course of the past year. Now suppose that access behavior 602 corresponds to Employee A's access history for the current day. Access behavior 602 indicates a sequence in which different security checkpoints are accessed. The sequence includes sequence positions 602A-B. In this example, sequency position 602A is accessed first. Sequence position 602A is followed by sequence position 602B. This means that Employee A first goes to Room X at sequence position 602A. Employee A remains in Room X for thirty minutes. After going to Room X, Employee A then goes to Room Y at sequence position 602B. Employee A remains in Room Y for fifty minutes.

In this example, at action 603, the security analysis components 620 may detect an inconsistent access behavior for Employee A. Specifically, as indicated by access model 601, Employee A has historically (e.g., over the course of the past year) gone from Room X to Room Z. However, on the current day, as indicated by access behavior 602, Employee A has instead gone from Room X to Room Y. This is an inconsistent access behavior because it differs from Employee A's access pattern over the course of the past year. In some examples, this may indicate a potential security-related incident. Also, in some examples, this may also indicate a change associated with Employee A. For example, this may indicate that Employee A has changed roles within the company. As another example, this may indicate that the reporting chain of Employee A has changed. In another example, this may indicate that an asset has moved from Room Z to Room Y. In yet another example, this may indicate a physical change (e.g., remodeling) to a building, such as splitting Room Z into Room Y and another room.

Upon detecting an inconsistent access behavior, the security analysis components 620 may perform an inconsistency response operation. This may include, for example, sending a notification (e.g., a security alert) associated with the inconsistent checkpoint access behavior. As yet another example, the inconsistency response operation may include providing suggestions of potential changes that may be indicated by the behavior, such as a change in roles and/or reporting chain of Employee A, a moving of an asset from Room Z to Room Y, a building remodeling involving Room Z, and the like. In some examples, a user (e.g., administrator) may optionally confirm or deny any, or all, of these suggestions.

Figure 7:
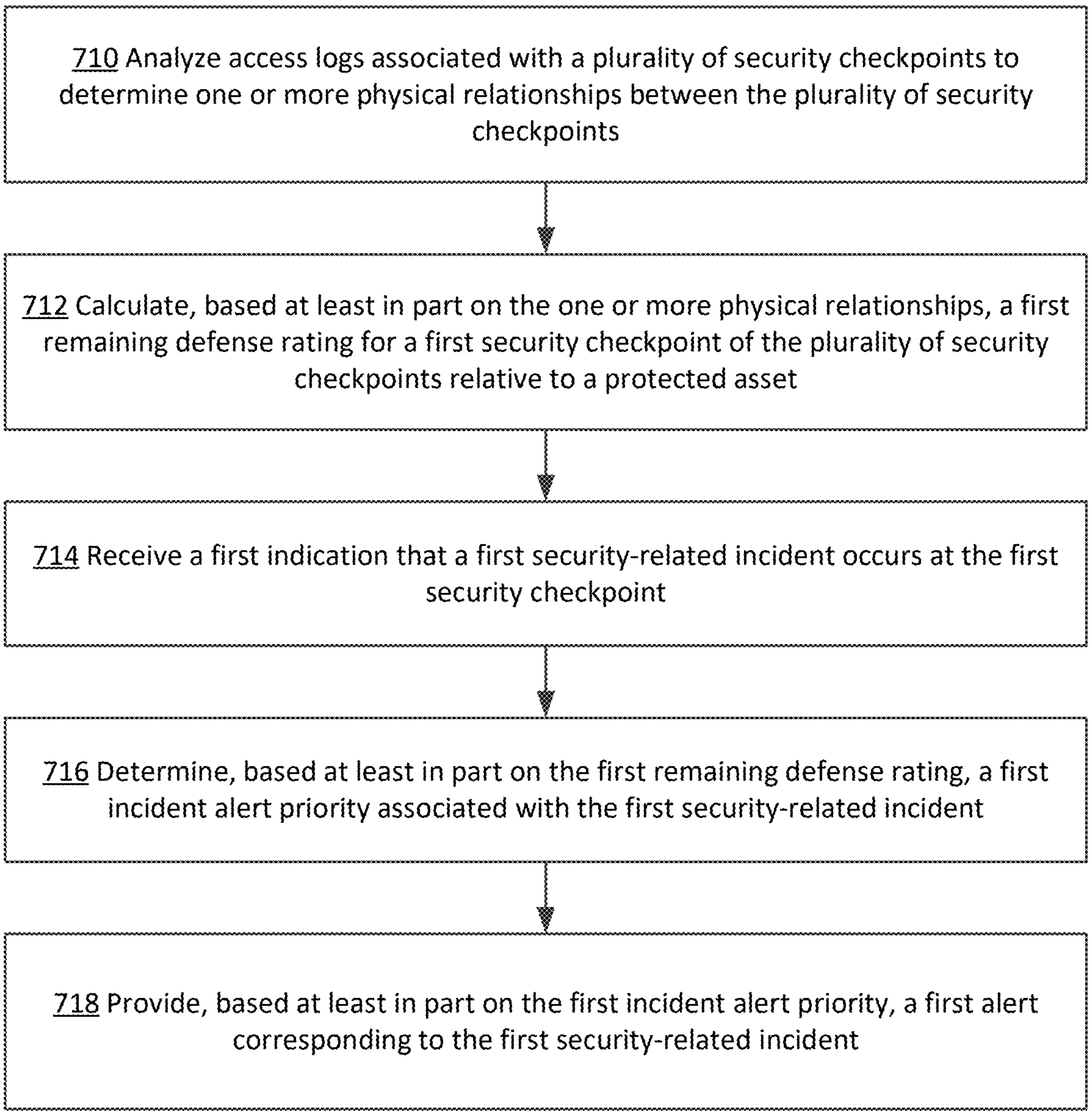
FIG. 7 is a flowchart illustrating an example security-related incident alert prioritization process that may be used in accordance with the present description.

FIG. 7 is a flowchart illustrating an example security-related incident alert prioritization process that may be used in accordance with the present description. At operation 710, access logs associated with a plurality of security checkpoints are analyzed to determine one or more physical relationships between the plurality of security checkpoints. In some examples, the determined physical relationships may include a distance between two checkpoints and/or an access dependency between two checkpoints. In some examples, operation 710 may include determining access times for one or more identities associated with the plurality of security checkpoints, determining, based on the access times, an access order for the plurality of security checkpoints; and determining, based on the access order, one or more access dependencies between two security checkpoints in the plurality of security checkpoints. An access dependency, as that term is used herein, refers to a physical relationship in which a person must enter through a first checkpoint prior to entering a second checkpoint. Access to a second checkpoint is dependent on entering a first checkpoint when a person must enter through the first checkpoint prior to entering the second checkpoint. To determine physical relationships between different security checkpoints, checkpoint history data (e.g., access logs) may be analyzed to identify times at which people entered and/or exited through each security checkpoint. These entrance and/or exit times may then be used to determine common checkpoint access sequences. For example, in some cases, if the checkpoint history data indicates that each person that has accessed Checkpoint B has also previously entered Checkpoint A, then it may be determined that access to Checkpoint B is dependent on entering Checkpoint A. The checkpoint history data may be analyzed to determine an average time difference between the times at which Checkpoints A and B were accessed. In one specific example, it may be determined that, on average, that Checkpoint A was accessed thirty seconds before Checkpoint B. In some examples, the average access time difference may be divided by an estimated human walking speed to in order to determine an estimated distance between checkpoints. For example, in some cases, it may be assumed that the average human walks at a speed of 1.5 meters per second. Accordingly, in this example, the estimated distance between Checkpoints A and B may be determined to be twenty meters (thirty seconds divided by 1.5 meters per second). In some examples, a checkpoint diagram may be generated that represents the determined physical relationships (e.g., distances and/or access dependencies) between security checkpoints. Thus, operation 710 may also include determining access times for one or more identities associated with the plurality of security checkpoints, and determining, based on the access times, a distance between two security checkpoints in the plurality of security checkpoints.

At operation 712, a first remaining defense rating for a first security checkpoint of the plurality of security checkpoints relative to a protected asset is calculated based at least in part on the one or more physical relationships. The protected asset may be directly protected by an asset security checkpoint of the plurality of security checkpoints. The term directly protected, as used herein, means that there are no intervening security checkpoints between the asset security checkpoint and the protected asset. In some examples, the first remaining defense rating may be calculated based at least in part on a number of intervening security checkpoints between the first security checkpoint and the asset security checkpoint. Also, in some examples, the first remaining defense rating may be calculated based at least in part on a distance between two security checkpoints of the plurality of security checkpoints. In some examples, the first remaining defense rating may be calculated based on a weighted hierarchy of the physical relationships. In particular, in some examples, a number of intervening security checkpoints relative to the protected asset is a first-highest weighted physical relationship in the weighted hierarchy of the physical relationships. Additionally, in some examples, a distance between two security checkpoints of the plurality of security checkpoints is a second-highest weighted physical relationship in the weighted hierarchy of the physical relationships.

As described above with reference to FIG. 2, diagram 150 shows physical relationships between asset 109, asset checkpoint (ACP) 110 and checkpoints (CPs) 111-114. Asset 109 is a protected asset. Asset 109 is directly protected by asset checkpoint 110. For example, in some cases, the asset checkpoint 110 may be located at the entrance to a room that contains the asset 109. As described above with reference to FIG. 1, logs 122 and/or video 104A-N may be used to determine physical relationship data 125, for example including checkpoint distance and dependency data. As shown in FIG. 2, the physical relationship data 125 may be used to determine a remaining defense rating for each checkpoint 111-114 relative to the protected asset. The remaining defense rating may indicate the amount of defensive security for a checkpoint 111-114 relative to the asset 109. The remaining defense ratings may be calculated by prioritization engine 165 and may be stored within defense rating data 163.

In some examples, the remaining defense rating may be calculated based on a weighted hierarchy of physical relationships, such as may be specified in weighting rules 166. In one specific example, a number of intervening security checkpoints relative to the asset 109 may be a first-highest weighted physical relationship in the weighted hierarchy of physical relationships. Additionally, a distance between security checkpoints may be a second-highest weighted physical relationship in the weighted hierarchy of physical relationships. For example, the distance between security checkpoints may be used as a tiebreaker when two checkpoints have the same number of intervening security checkpoints relative to the asset 109. As shown in diagram 150, there is one intervening checkpoint (checkpoint 112) between checkpoint 111 and the asset checkpoint 110. Additionally, there are zero intervening security checkpoints between checkpoint 113 and the asset checkpoint 110. Furthermore, there are also zero intervening security checkpoints between checkpoint 114 and the asset checkpoint 110. In this scenario, checkpoint 111 may have a higher remaining defense rating than any of checkpoints 112-114. This is because checkpoint 112 intervenes between checkpoint 111 and asset checkpoint 110. Thus, checkpoint 111 has more intervening security checkpoints (one) than any of checkpoints 112-114 have (zero) relative to the asset 109. Moreover, suppose that checkpoint 114 is fifty meters from the asset checkpoint 110. Additionally, suppose that checkpoint 113 is ten meters from the asset checkpoint 110. Furthermore, suppose that checkpoint 112 is eight meters from the asset checkpoint 110. In this example, the distance may be used as a tiebreaker between checkpoints 112-114. Specifically, checkpoint 114 may have a higher remaining defense rating than checkpoint 113 because checkpoint 114 is further away from the asset checkpoint 110 (fifty meters) than checkpoint 113 is from asset checkpoint 110 (ten meters). Additionally, checkpoint 113 may have a higher remaining defense rating than checkpoint 112 because checkpoint 113 is further away from the asset checkpoint 110 (ten meters) than checkpoint 112 is from asset checkpoint 110 (eight meters).

At operation 714, a first indication is received that a first security-related incident occurs at the first security checkpoint. For example, as described above with reference to FIG. 2, when security incidents (e.g., a security breaches) occur at one or more security checkpoints, the security incidents may be reported to the prioritization engine 165 as incident data 164. In some examples, the checkpoints 111-114 and asset checkpoint 110 may report security incidents by transmitting incident data 164 (directly or indirectly) to prioritization engine 165, for example via on or more communications networks. For each security-related incident, the incident data 164 may include, for example, a time of occurrence of the incident, an indication of the checkpoint at which the incident occurred, an indication of the type of security incident (e.g., security breach, invalid identity data presented, etc.), and other related information.

At operation 716, a first incident alert priority associated with the first security-related incident is determined based at least in part on the first remaining defense rating. As described above with reference to FIG. 2, the prioritization engine 165 may use the remaining defense ratings in defense rating data 163 to determine incident alert priorities 167 associated with the security incidents. The incident alert priorities 167 may be inversely correlated (e.g., inversely proportional) to the remaining defense ratings. This is because the remaining defense ratings represent the estimated difficulty required for an unauthorized person to advance from a respective checkpoint to the asset 109. For example, in some cases, when a security incident occurs at a given checkpoint with a high remaining defense rating, the security incident may be assigned a low incident alert priority. By contrast, in some cases, when a security incident occurs at a given checkpoint with a low remaining defense rating, the security incident may be assigned a high incident alert priority. FIG. 2 shows an example incident scenario 151 in which security breaches occur simultaneously at checkpoints 111, 113 and 114. As shown in example incident prioritization data 152, the security breach at checkpoint 113 may be given the first (e.g., highest) priority, the security breach at checkpoint 114 may be assigned the second priority, and the security breach at checkpoint 111 may be assigned the third (e.g., lowest) priority. This is because checkpoint 111 has a higher remaining defense rating than checkpoint 114, and checkpoint 114 has a higher remaining defense rating than checkpoint 113. As described above, checkpoint 111 has a higher remaining defense rating than checkpoint 114 because checkpoint 111 has more intervening security checkpoints (one) than checkpoint 114 has (zero) relative to the asset 109. As also described above, checkpoint 114 has a higher remaining defense rating than checkpoint 113 because checkpoint 114 is further away from the asset checkpoint 110 (fifty meters) than checkpoint 113 is from asset checkpoint 110 (ten meters).

At operation 718, a first alert corresponding to the first security-related incident is provided based at least in part on the first incident alert priority. As described above with reference to FIG. 2, upon being determined by prioritization engine 165, the incident alert priorities 167 may be provided to notification components 168. The notification components 168 may then generate alerts 169 based on the incident alert priorities 167. Thus, an administrator may be notified of the security breach at checkpoint 113 with the highest priority, to allow the administrator to address this security breach (e.g., by sending guards to checkpoint 113, etc.) before the other security breaches. For example, an alert of the security breach at checkpoint 113 may be sent with greater urgency (e.g., sent first in time, sent to a higher priority address or via a higher priority communications medium) than alerts of the other security breaches at checkpoints 111 and 114.

In some examples, a second remaining defense rating for a second security checkpoint of the plurality of security checkpoints relative to the protected asset may be calculated based at least in part on the one or more physical relationships. A second indication may be received that a second security-related incident occurs at the second security checkpoint. A second incident alert priority associated with the second security-related incident may be determined based at least in part on the second remaining defense rating. A second alert corresponding to the second security-related incident may be provided based at least in part on the second incident alert priority. One or more characteristics of the second alert may be based on the first alert corresponding to the first security-related incident. For example, in some cases, the first alert may be an alert for the security breach at checkpoint 113, and the second alert may be an alert for the security breach at checkpoint 114. In some examples, because the security breach at checkpoint 113 has a higher priority than the security breach at checkpoint 114, the first alert for the security breach at checkpoint 113 may be sent to an administrator prior to sending the second alert for the security breach at checkpoint 114. Thus, in this example, the timing of the sending of the second alert may be a characteristic of the second alert that is based on the first alert.

Figure 8:
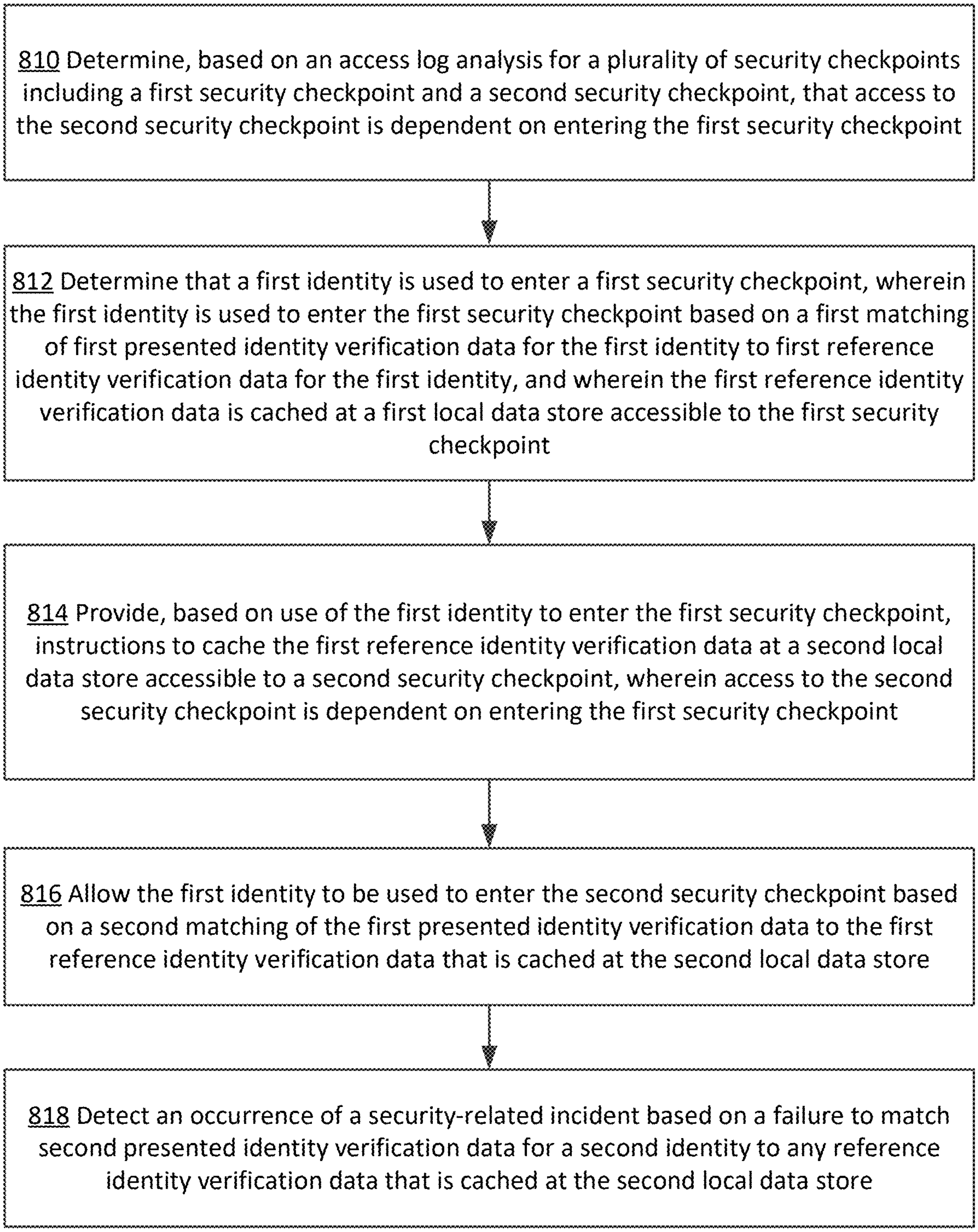
FIG. 8 is a flowchart illustrating an example just-in-time identity verification data caching process that may be used in accordance with the present description.

FIG. 8 is a flowchart illustrating an example just-in-time identity verification data caching process that may be used in accordance with the present description. At operation 810, it is determined, based on an access log analysis for a plurality of security checkpoints including a first security checkpoint and a second security checkpoint, that access to the second security checkpoint is dependent on entering the first security checkpoint. In some examples, operation 810 may include determining access times (e.g., entrance times) for one or more identities associated with the plurality of security checkpoints; determining, based on the access times, an access order for the plurality of security checkpoints; and determining, based on the access order, that the access to the second security checkpoint is dependent on entering the first security checkpoint. The access order may be an order in which security checkpoints are entered. The term dependent checkpoint, as used herein, refers to a physical relationship in which a person must enter through a first checkpoint prior to entering a second checkpoint. As described herein, in order to enter through the first checkpoint, the person may be required to present identity verification data that matches stored reference identity verification data. Thus, operation 810 may include determining, based on an access log analysis for a plurality of security checkpoints including a first security checkpoint and a second security checkpoint, that a person must enter through the first security checkpoint prior to entering through the second security checkpoint. To determine physical relationships between different security checkpoints, checkpoint history data (e.g., access logs) may be analyzed to identify times at which people entered and/or exited through each security checkpoint. These entrance and/or exit times may then be used to determine common checkpoint access sequences. For example, in some cases, if the checkpoint history data indicates that each person that has entered Checkpoint B has also previously entered Checkpoint A, then it may be determined that access to Checkpoint B is dependent on entering Checkpoint A.

In one specific example, the first security checkpoint may be in a lobby of a building, the second security checkpoint may be in a room of the building, and access to the second security checkpoint in the room may be dependent on entering the first security checkpoint in the lobby. As described above with reference to FIG. 3, building representation 200 represents a building (e.g., an office building) owned by Company X. The building includes a lobby 201 and two rooms 202 and 203. The lobby 201 has a checkpoint 211. All people must pass through checkpoint 211 to enter the lobby 201. Additionally, all people that enter the building must enter through the lobby 201, for example via a front door included in the lobby 201. Thus, all people that enter the building must pass through checkpoint 211. Room 202 has a checkpoint 212. All people must pass through checkpoint 212 to enter room 202. Room 203 has a checkpoint 213. All people must pass through checkpoint 213 to enter room 203. Local data stores 221-223 store (e.g., cache) identity verification data for checkpoints 211-213, respectively. Local data stores 221-223 are locally accessible to checkpoints 211-213, respectively. For example, respective identity verification devices at checkpoints 211-213 may be able to retrieve data from local data stores 221-223, respectively, without the need to communicate via the Internet. One advantage of this local caching of identity verification data is that it may enable security systems to be resilient to Internet and other network outages.

In some examples, respective reference identity verification data for a corresponding identity is cached at the second local data store only after the corresponding identity is used to enter the first security checkpoint. For example, as described above with reference to FIG. 3, checkpoint 212 (in room 202) is dependent on checkpoint 211 (in lobby 201). This is because all people are required to enter the lobby 201 prior to entering room 202. Additionally, checkpoint 213 (in room 203) is dependent on checkpoint 211 (in lobby 201). This is because all people are required to enter the lobby 201 prior to entering room 203. In some examples, checkpoint 211 in lobby 201 may locally cache identity verification data for all employees in Company X. This is because there is a possibility that any employee in Company X company may potentially enter the building at any given time. However, in contrast to the checkpoint 211, the checkpoints 212-213 in rooms 202-203 may not locally cache identity data for all employees in the Company X. Rather, as described herein, the checkpoints 212-213 may cache identity verification data only for individuals that have previously entered through the checkpoint 211. This is because all people that enter the building are required to pass through the checkpoint 211. Thus, a person cannot access checkpoints 212-213 unless the person has first passed through the checkpoint 211. This caching strategy may allow a reduction in the quantity of data that needs to be cached locally to checkpoints 212 and 213 at local data stores 222 and 223, respectively, thereby potentially lowering the cost and complexity of the security system.

At operation 812, it is determined that a first identity is used to enter a first security checkpoint, wherein the first identity is used to enter the first security checkpoint based on a first matching of first presented identity verification data for the first identity to first reference identity verification data for the first identity, and wherein the first reference identity verification data is cached at a first local data store accessible to the first security checkpoint. For example, at act 231 of FIG. 3, the cache management engine 265 may detect that Employee A enters checkpoint 211. The cache management engine 265 may receive access notifications 264, which may include notifications of the identifies of people that enter and/or exit through checkpoint 211. In some examples, the access notifications 264 may indicate that Employee A has entered checkpoint 211. In some examples, in order to enter checkpoint 211, Employee A may present identity verification data (e.g., by presenting a badge to a badge reader). This presented identity verification data may then be matched to reference identity verification data for Employee A that is stored at local data store 221.

At operation 814, first instructions are provided, based on use of the first identity to enter the first security checkpoint, to cache the first reference identity verification data at a second local data store accessible to a second security checkpoint, wherein access to the second security checkpoint is dependent on entering the first security checkpoint. Caching of the first reference identity verification data at the second local data store may allow the first identity to be used to enter the second security checkpoint. For example, after Employee A successfully enters checkpoint 211, the cache management engine 265 may send instructions to checkpoints 212 and 213 to obtain and locally cache identity verification data for Employee A. At act 232, checkpoints 212 and 213 may obtain and locally cache identity verification data for Employee A at local data stores 222 and 223, respectfully. As described above with reference to FIG. 3, checkpoint 212 (in room 202) is dependent on checkpoint 211 (in lobby 201). This is because all people are required to enter the lobby 201 prior to entering room 202. Additionally, checkpoint 213 (in room 203) is dependent on checkpoint 211 (in lobby 201). This is because all people are required to enter the lobby 201 prior to entering room 203.

At operation 816, the first identity is allowed to be used to enter the second security checkpoint based on a second matching of the first presented identity verification data to the first reference identity verification data that is cached at the second local data store. For example, at act 233 of FIG. 3, checkpoint 212 may detect that the badge of Employee A is used to enter checkpoint 212. At act 234, the entry into checkpoint 212 (and room 202) may be validated by matching the badge data of Employee A to the cached identity verification data for Employee A.

In some examples, the first reference identity verification data may be deleted from the second local data store based on at least one of a detection of the first identity exiting the first security checkpoint, an expiration of a configurable time period, or an occurrence of a set time. For example, the cache management engine 265 may also receive access notifications 264 when Employee X exits via checkpoint 211 to leave the building. In some cases, when Employee X exits via checkpoint 211 to leave the building, cache management engine may send instructions to checkpoints 212 and 213 to delete the identity verification data for Employee X from local storage in local data stores 222 and 223, respectively. Also, in some examples, the identity verification data for Employee X may be stored in local data stores 222 and 223 for a configurable time period after Employee X enters checkpoint 211. The identity verification data for Employee X may then be deleted upon expiration of the configurable time period. In one specific example, the configurable time period may be twenty-four hours. Additionally, in some examples, the identity verification data for Employee X may be deleted from local data stores 222 and 223 at an occurrence of a set time, such as when the building closes at the end of a workday (e.g., at 5:00 in the evening).

At operation 818, an occurrence of a security-related incident is detected based on a failure to match second presented identity verification data for a second identity to any reference identity verification data that is cached at the second local data store. For example, at act 241 of FIG. 3, checkpoint 212 detects that the badge of Employee B is used to attempt to enter checkpoint 212. In this example, the badge of employee B is not used to enter checkpoint 211 prior to being used at checkpoint 212. Thus, identity verification data for Employee B is not cached at checkpoint 213. Accordingly at act 242, a possible incident is detected because the badge data for Employee B will not be matched to any identity verification data that is cached locally at local data store 223 for checkpoint 213.

Figure 9:
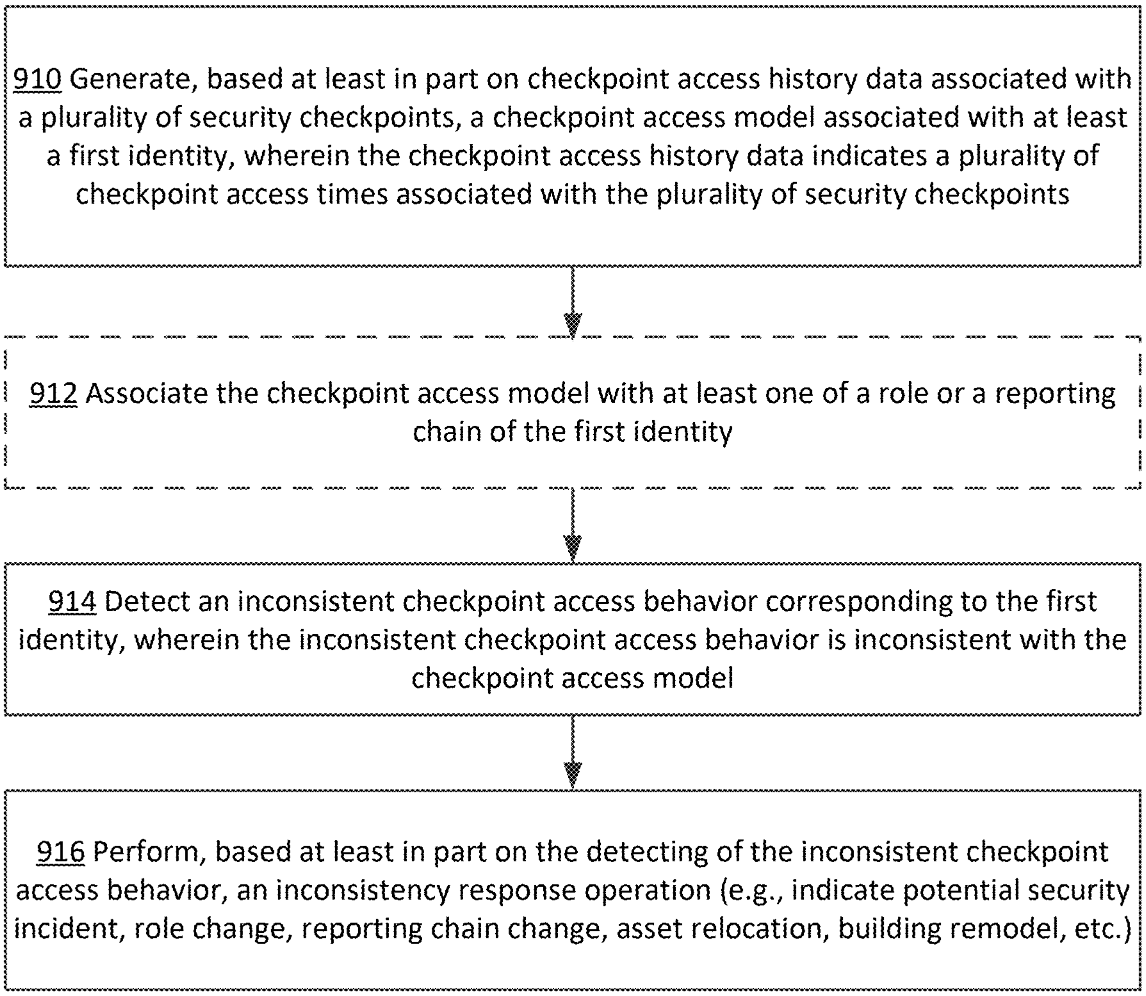
FIG. 9 is a flowchart illustrating an example access model analysis process that may be used in accordance with the present description.

FIG. 9 is a flowchart illustrating an example access model analysis process that may be used in accordance with the present description. At operation 910, a checkpoint access model associated with at least a first identity is generated based at least in part on checkpoint access history data associated with a plurality of security checkpoints, wherein the checkpoint access history data indicates a plurality of checkpoint access times associated with the plurality of security checkpoints. The checkpoint access model indicates at least one of a checkpoint access sequence or checkpoint access timing information. In some examples, the checkpoint access timing information may indicate at least one time duration for which at least one of the plurality of security checkpoints is accessed. Thus, in some examples, the checkpoint access model may indicate a checkpoint access sequence and at least one time duration for which at least one of the plurality of security checkpoints is accessed. As described above with reference to FIG. 6, access history data 611, such as security checkpoint access logs, may be analyzed by security analysis components 620 to generate an access model 601 for one or more identities, such as one or more employees of an organization. The access history data 611 may indicate checkpoint access times for a plurality of security checkpoints. In some examples, each entry in the access history data 611 may include information such as an identity (e.g., name) of a person entering and/or exiting a checkpoint, a time of the entrance or exit, an indication of the respective checkpoint location (e.g., building name, floor number, room number, etc.) and/or other related information.

The access model 601 indicates a sequence in which different security checkpoints are accessed. The sequence includes sequence positions 601A-D. In this example, sequency position 601A is accessed first. Sequence position 601A is followed by sequence position 601B. Sequence position 601B is followed by sequence position 601C. Sequence position 601C is followed by sequence position 601D. This means that a corresponding identity will first go to Room X at sequence position 601A. After going to Room X, the identity will then go to Room Z at sequence position 601B. After going to Room Z, the identity will then go to Room W at sequence position 601C. After going to Room W, the identity will then go to Room K at sequence position 601D. In this example, the access model 601 also indicates a duration of time spent at each location. Specifically, the identity remains in Room X for thirty minutes, the identity remains in Room Z for fifteen minutes, the identity remains in Room W for sixty minutes, and the identity remains in Room X for twenty minutes.

At operation 912, the checkpoint access model is associated with at least one of a role or a reporting chain of the first identity. Operation 912 is shown with dashed lines in FIG. 9 because some checkpoint access models may not be associated with a role and/or reporting chain. As described above, in some examples, the access model 601 may correspond to a group of people, such as a group of people having a same role and/or reporting chain within an organization. In some examples, the security analysis components 620 may receive role information 612, which may indicate roles for one or more people within an organization. A role may be, for example, a job or task type, such as custodian, doctor, lawyer, administrator, engineer, teacher, student, security guard, salesperson, etc. The role information 612 may be used to assist in matching an access model to a corresponding role. For example, it may be detected that all people that have an access history pattern that correlates to access model 601 are also janitors that work for Company X. Additionally, it may be detected that all janitors that work for Company X have an access history pattern that correlates to access model 601. Based on this information, it may be determined that access model 601 corresponds to janitors that work for Company X. Access model 601 may therefore be associated with the janitor role. In some examples, different access models may be created for other roles within Company X. Furthermore, in some examples, the security analysis components 620 may receive reporting chain information 613, which may indicate reporting chains for one or more people within an organization. The reporting chain information 613 may include, for example, information about a person's supervisor (e.g., boss, teacher, mentor, etc.). The reporting chain information 613 may also include information about a location to which a person reports for work (e.g., city, building number, etc.). The reporting chain information 613 may be used to assist in matching an access model 601 to a corresponding reporting chain. For example, it may be detected that all people that have an access history pattern that correlates to access model 601 report to Supervisor X. Additionally, it may be detected that people that report to Supervisor X have an access history pattern that correlates to access model 601. Based on this information, it may be determined that access model 601 corresponds to people that report to Supervisor X. Access model 601 may therefore be associated with people that report to Supervisor X. Also, in some examples, access model 601 may be associated with both a role and a reporting chain, for example janitors that report to Supervisor X.

At operation 914, an inconsistent checkpoint access behavior corresponding to the first identity may be detected, wherein the inconsistent checkpoint access behavior is inconsistent with the checkpoint access model. As described above with reference to FIG. 6, the security analysis components 620 may use access model 601 to detect an inconsistent access behavior for a given identity. For example, consider a scenario in which access model 601 corresponds to a historical access pattern for Employee A over the course of the past year. Now suppose that access behavior 602 corresponds to Employee A's access history for the current day. Access behavior 602 indicates a sequence in which different security checkpoints are accessed. The sequence includes sequence positions 602A-B. In this example, sequency position 601A is accessed first. Sequence position 602A is followed by sequence position 602B. This means that Employee A first goes to Room X at sequence position 602A. Employee A remains in Room X for thirty minutes. After going to Room X, Employee A then goes to Room Y at sequence position 602B. Employee A remains in Room Y for fifty minutes.

In this example, at action 603, the security analysis components 620 may detect an inconsistent access behavior for Employee A. Specifically, as indicated by access model 601, Employee A has historically (e.g., over the course of the past year) gone from Room X to Room Z. However, on the current day, as indicated by access behavior 602, Employee A has instead gone from Room X to Room Y. This is an inconsistent access behavior because it differs from Employee A's access pattern over the course of the past year. In some examples, this may indicate a potential security-related incident. Also, in some examples, this may also indicate a change associated with Employee A. For example, this may indicate that Employee A has changed roles within the company. As another example, this may indicate that the reporting chain of Employee A has changed. In another example, this may indicate that an asset has moved from Room Z to Room Y. In yet another example, this may indicate a physical change (e.g., remodeling) to a building, such as splitting Room Z into Room Y and another room.

In some examples, a given person may be correlated with access model 601 based on the role and/or reporting chain of that person. This may be true even for new employees whose access history data may not be captured by access history data 611. For example, consider a scenario in which access model 601 is associated with the janitor role for Company X. Now suppose that Company X hires a new employee as a janitor. In this scenario, access model 601 may be correlated with the new employee, even though there may be no prior access history information for the new employee. Thus, in some examples, if the new employee behaves in a manner that is inconsistent with access model 601, this may also indicate a potential security concern. This may help organizations to monitor potential security risks even in scenarios where new employees are added and/or roles of existing employees are modified.

At operation 916, an inconsistency response operation is performed based at least in part on the detecting of the inconsistent checkpoint access behavior. In some examples, the inconsistency response operation may include providing a security alert associated with the inconsistent checkpoint access behavior. In some cases, the security alert may indicate a that a security incident has occurred (or may have potentially occurred). For example, when a person changes his access pattern by suddenly entering a room or location that has not been previously accessed, then this may indicate that this access was improper. Also, in some examples, the inconsistency response operation may include providing an indication regarding a change to at least one of a role or a reporting chain of the first identity. For example, consider a scenario in which a given employee has previously had an access pattern that matches an access model for a janitor.

Now suppose that this person suddenly assumes a new access pattern that matches an access model for a security guard. This may indicate that this person has switched roles from a janitor to a security guard. Also, in some examples, the inconsistency response operation may include providing an indication regarding a change to an asset location or usage of a building. For example, consider a scenario in which all lawyers in a company suddenly change from accessing a room on the first floor to accessing a room on the second floor. This may indicate that a given asset (e.g., a collection of legal books) has moved from the first floor to the second floor—or that a building usage has changed (e.g., a law library has moved from the first floor to the second floor). In some examples, the inconsistency response operation may include providing suggestions of potential changes that may be indicated by the inconsistent behavior. Also, in some examples, a user (e.g., administrator) may optionally confirm or deny any, or all, of these suggested changes.

In some examples, the access model 601 may be updated based at least in part on changes indicated by the inconsistent behavior. For example, in some cases, when a suggested change is confirmed by an administrator, the security analysis components 620 may modify the access model 601 based on the confirmed changes. For example, if it is confirmed that a law library has moved from the first floor to the second floor, then the access model 601 for lawyers may be updated to change an accessed location from the first floor to the second floor. As another example, if an asset that is accessed by a given employee has switched from Building A to Building B, then the access model 601 for the employee may be updated to change an accessed location from a room in Building A to a room in Building B. Additionally, in some examples, the security analysis components 620 may interact with other software systems, such as asset tracking systems, human resource systems, and the like. In some cases, when the security analysis components 620 make changes or updates to the asset model 601, the security analysis components 620 may send related notifications to one or more other software systems. For example, when the asset model 601 is updated based on an asset being moved from one room to another, the security analysis components 620 may also send a notification to an asset tracking software system to indicate that the asset has changed locations. The asset tracking system may then update its own records (e.g., via database updates) to indicate that the asset has changed locations. In yet other examples, when an asset model 601 is updated based on an employee changing roles and/or reporting chains, the security analysis components 620 may also send a notification to a human resource system to indicate that the employee has changed roles and/or reporting chains. The human resource system may then update its own records (e.g., via database updates) to indicate that the employee has changed roles and/or reporting chains.

Figure 10:
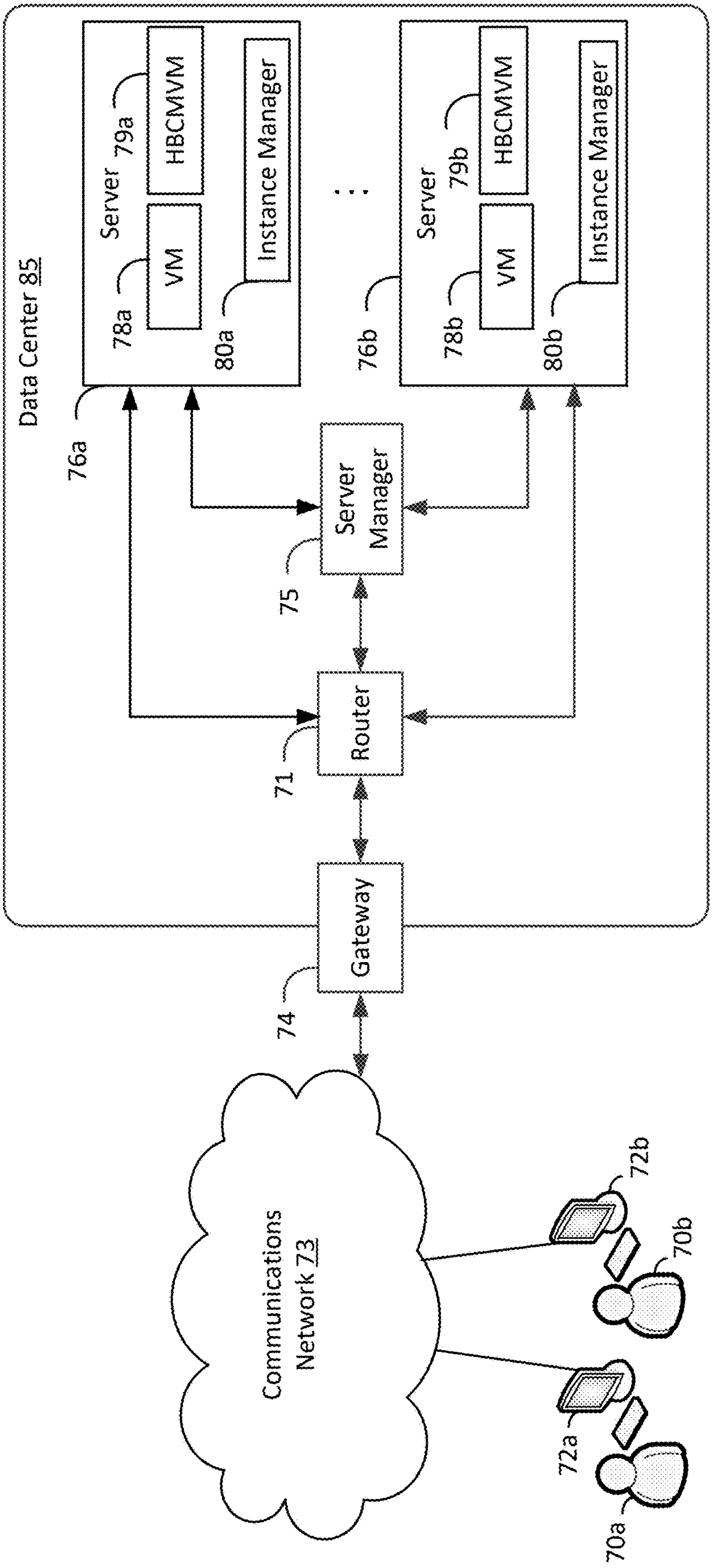
FIG. 10 is a diagram illustrating an example system for transmitting and providing data that may be used in accordance with the present description.

An example system for transmitting and providing data will now be described in detail. In particular, FIG. 10 illustrates an example computing environment in which the embodiments described herein may be implemented. FIG. 10 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-b* (which may be referred herein singularly as virtual machine instance 78 or in the plural as virtual machine instances 78). In this example, the resources also the history-based checkpoint management virtual machines (HBCMVM's) 79*a-b*, which are virtual machines that are configured to execute any, or all, of the access history-based security checkpoint management techniques described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that PCn one or more physical resources, such as a single virtual machine instance with multiple virtual processors that PCn multiple distinct physical computing systems.

Referring to FIG. 10, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 10 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 10, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 10, a server manager 75 is also employed to at least in part direct various communications to, from and/or between servers 76*a* and 76*b*. While FIG. 10 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 10 has been greatly simplified and that many more networks and networking devices may be utilized to interconnect the various computing systems disclosed herein. These network topologies and devices should be apparent to those skilled in the art.

It should also be appreciated that data center 85 described in FIG. 10 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 11:
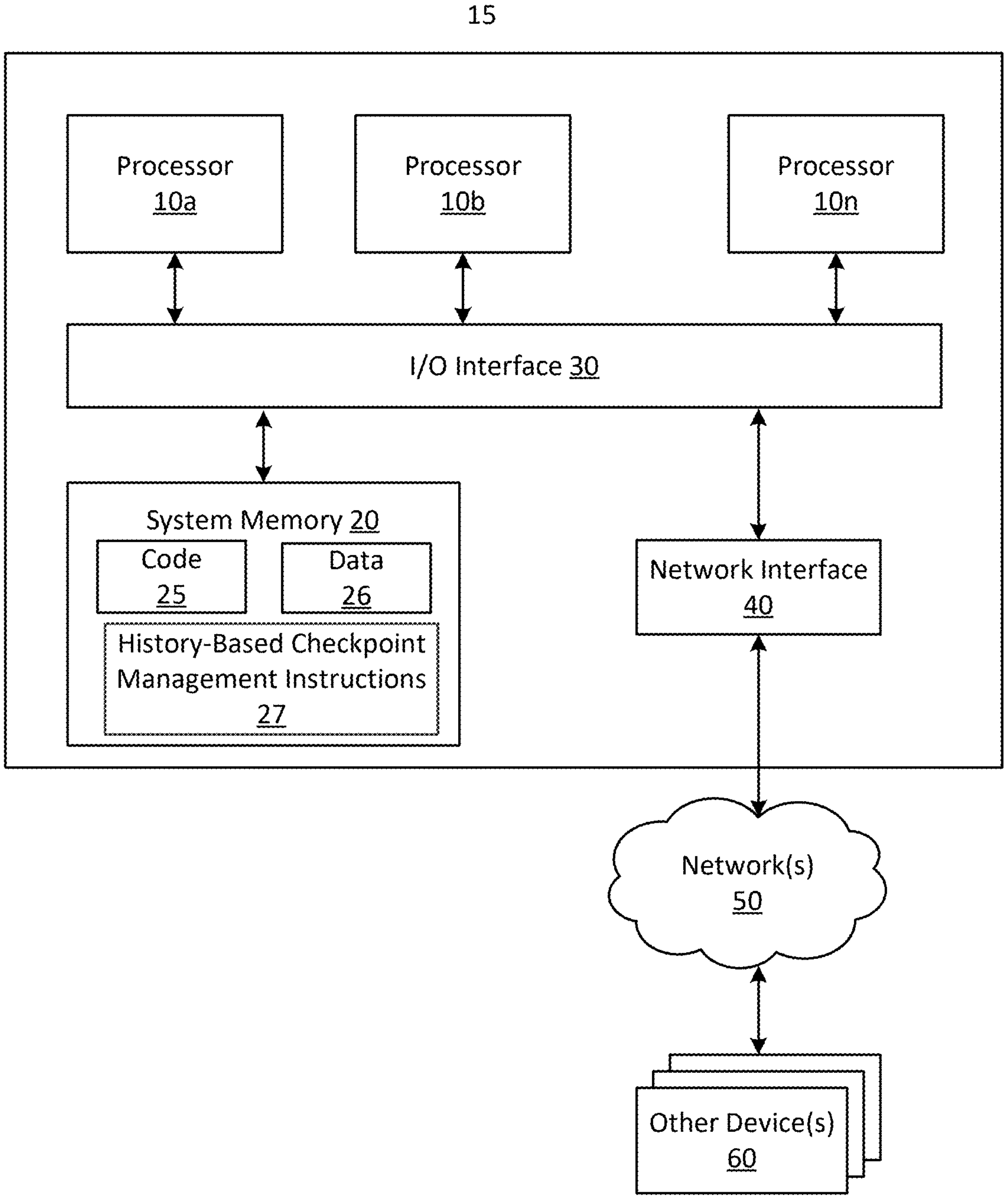
FIG. 11 is a diagram illustrating an example computing system that may be used in accordance with the present description.

In at least some embodiments, a server that implements a portion or all of one or more of the technologies described herein may include a computer system that includes or is configured to access one or more computer-accessible media. FIG. 11 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, PCRC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes history-based checkpoint management instructions 27, which are instructions for executing any, or all, of the access history-based security checkpoint management techniques described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:

one or more processors; and one or more memories having stored therein first instructions that, upon execution by the one or more processors, cause the computing system to perform operations comprising:

analyzing access logs associated with a plurality of security checkpoints to compute a checkpoint-dependency graph that identifies a first security checkpoint as a prerequisite for access to a second security checkpoint;

determining that a first identity is used to enter the first security checkpoint, wherein the first identity is used to enter the first security checkpoint based on a first matching by the computing system of first presented identity verification data for the first identity to first reference identity verification data for the first identity, and wherein the first reference identity verification data is cached at a first local data store accessible to the first security checkpoint; and responsive to determining that the first identity was used to enter the first security checkpoint and to the checkpoint-dependency graph, caching the first reference identity verification data at a second local data store accessible to the second security checkpoint, wherein caching of the first reference identity verification data at the second local data store allows the first identity to be used to enter the second security checkpoint.

2. The computing system of claim 1, wherein respective reference identity verification data for a corresponding identity is cached at the second local data store only after the corresponding identity is used to enter the first security checkpoint.

3. The computing system of claim 1, wherein the first security checkpoint is in a lobby of a building, wherein the second security checkpoint is in a room of the building, and wherein access to the second security checkpoint in the room is dependent on entering the first security checkpoint in the lobby.

4. The computing system of claim 1, wherein the operations further comprise:

detecting an occurrence of a security-related incident based on a failure to match second presented identity verification data for a second identity to any reference identity verification data that is cached at the second local data store.

5. A computer-implemented method comprising:

analyzing access logs associated with a plurality of security checkpoints to compute a checkpoint dependency graph that identifies a first security checkpoint as a prerequisite for access to a second security checkpoint;

determining that a first identity is used to enter a first security checkpoint, wherein the first identity is used to enter the first security checkpoint based on a first matching by a computing device of first presented identity verification data for the first identity to first reference identity verification data for the first identity, and wherein the first reference identity verification data is cached at a first local data store accessible to the first security checkpoint; and responsive to determining that the first identity was used to enter the first security checkpoint and to the checkpoint-dependency graph, caching the first reference identity verification data at a second local data store accessible to a second security checkpoint, wherein access to the second security checkpoint is dependent on entering the first security checkpoint, and wherein caching of the first reference identity verification data at the second local data store allows the first identity to be used to enter the second security checkpoint.

6. The computer-implemented method of claim 5, wherein respective reference identity verification data for a corresponding identity is cached at the second local data store only after the corresponding identity is used to enter the first security checkpoint.

7. The computer-implemented method of claim 5, wherein the first security checkpoint is in a lobby of a building, wherein the second security checkpoint is in a room of the building, and wherein access to the second security checkpoint in the room is dependent on entering the first security checkpoint in the lobby.

8. The computer-implemented method of claim 5, further comprising:

allowing the first identity to be used to enter the second security checkpoint based on a second matching of the first presented identity verification data to the first reference identity verification data that is cached at the second local data store.

9. The computer-implemented method of claim 5, further comprising:

detecting an occurrence of a security-related incident based on a failure to match second presented identity verification data for a second identity to any reference identity verification data that is cached at the second local data store.

10. The computer-implemented method of claim 5, further comprising:

determining, based on an access log analysis for a plurality of security checkpoints including the first security checkpoint and the second security checkpoint, that the access to the second security checkpoint is dependent on entering the first security checkpoint.

11. The computer-implemented method of claim 10, wherein determining, based on an access log analysis for a plurality of security checkpoints including the first security checkpoint and the second security checkpoint, that the access to the second security checkpoint is dependent on entering the first security checkpoint comprises:

determining access times for one or more identities associated with the plurality of security checkpoints;

determining, based on the access times, an access order for the plurality of security checkpoints; and determining, based on the access order, that the access to the second security checkpoint is dependent on entering the first security checkpoint.

12. The computer-implemented method of claim 5, wherein the first reference identity verification data is deleted from the second local data store based on at least one of a detection of the first identity exiting the first security checkpoint, an expiration of a configurable time period, or an occurrence of a set time.

13. One or more non-transitory computer-readable storage media having stored thereon first instructions that, upon execution by one or more computing devices, cause the one or more computing devices to perform operations comprising:

analyzing access logs associated with a plurality of security checkpoints to compute a checkpoint dependency graph that identifies a first security checkpoint as a prerequisite for access to a second security checkpoint;

determining that a first identity is used to enter a first security checkpoint, wherein the first identity is used to enter the first security checkpoint based on a first matching by a computing device of first presented identity verification data for the first identity to first reference identity verification data for the first identity, and wherein the first reference identity verification data is cached at a first local data store accessible to the first security checkpoint; and responsive to determining that the first identity was used to enter the first security checkpoint and to the checkpoint-dependency graph, caching the first reference identity verification data at a second local data store accessible to a second security checkpoint, wherein access to the second security checkpoint is dependent on entering the first security checkpoint, and wherein caching of the first reference identity verification data at the second local data store allows the first identity to be used to enter the second security checkpoint.

14. The one or more non-transitory computer-readable storage media of claim 13, wherein respective reference identity verification data for a corresponding identity is cached at the second local data store only after the corresponding identity is used to enter the first security checkpoint.

15. The one or more non-transitory computer-readable storage media of claim 13, wherein the first security checkpoint is in a lobby of a building, wherein the second security checkpoint is in a room of the building, and wherein access to the second security checkpoint in the room is dependent on entering the first security checkpoint in the lobby.

16. The one or more non-transitory computer-readable storage media of claim 13, wherein the operations further comprise:

allowing the first identity to be used to enter the second security checkpoint based on a second matching of the first presented identity verification data to the first reference identity verification data that is cached at the second local data store.

17. The one or more non-transitory computer-readable storage media of claim 13, wherein the operations further comprise:

detecting an occurrence of a security-related incident based on a failure to match second presented identity verification data for a second identity to any reference identity verification data that is cached at the second local data store.

18. The one or more non-transitory computer-readable storage media of claim 13, wherein the operations further comprise:

determining, based on an access log analysis for a plurality of security checkpoints including the first security checkpoint and the second security checkpoint, that the access to the second security checkpoint is dependent on entering the first security checkpoint.

19. The one or more non-transitory computer-readable storage media of claim 18, wherein determining, based on an access log analysis for a plurality of security checkpoints including the first security checkpoint and the second security checkpoint, that the access to the second security checkpoint is dependent on entering the first security checkpoint comprises:

determining access times for one or more identities associated with the plurality of security checkpoints;

determining, based on the access times, an access order for the plurality of security checkpoints; and determining, based on the access order, that the access to the second security checkpoint is dependent on entering the first security checkpoint.

20. The one or more non-transitory computer-readable storage media of claim 13, wherein the first reference identity verification data is deleted from the second local data store based on at least one of a detection of the first identity exiting the first security checkpoint, an expiration of a configurable time period, or an occurrence of a set time.

* * * * *